United States Patent [19]
Dail et al.

[11] Patent Number: 5,570,355
[45] Date of Patent: Oct. 29, 1996

[54] METHOD AND APPARATUS ENABLING SYNCHRONOUS TRANSFER MODE AND PACKET MODE ACCESS FOR MULTIPLE SERVICES ON A BROADBAND COMMUNICATION NETWORK

[75] Inventors: James E. Dail, Marlboro; Chia-Chang Li, Holmdel; Peter D. Magill, Freehold; Kotikalapudi Sriram, Marlboro; Norman A. Whitaker, Jr., Atlantic Highlands, all of N.J.

[73] Assignee: Lucent Technologies Inc., Murray Hill, N.J.

[21] Appl. No.: 340,927

[22] Filed: Nov. 17, 1994

[51] Int. Cl.$^6$ ............................ H04L 12/56; H04Q 11/04
[52] U.S. Cl. .................... 370/60.1; 370/85.2; 370/94.2; 370/95.3; 370/118
[58] Field of Search ............................ 370/58.1, 58.2, 370/58.3, 60, 60.1, 61, 66, 68, 68.1, 79, 80, 82, 83, 84, 85.2, 85.3, 85.6, 85.7, 94.1, 94.2, 95.1, 95.3, 110.1, 111, 112, 118; 340/825.5, 825.51, 825.52; 348/6, 7, 467, 469

[56] References Cited

U.S. PATENT DOCUMENTS

| | | | |
|---|---|---|---|
| 4,914,650 | 4/1990 | Sriram | 370/60 |
| 4,926,416 | 5/1990 | Weik | 370/60.1 |
| 5,012,469 | 4/1991 | Sardana | 370/85.2 |
| 5,144,619 | 9/1992 | Munter | 370/60.1 |
| 5,173,901 | 12/1992 | DeSomer | 370/60.1 |
| 5,258,979 | 11/1993 | Oomuro et al. | 370/95.1 |
| 5,327,428 | 7/1994 | Van As et al. | 370/94.2 |
| 5,392,280 | 2/1995 | Zheng | 370/60 |
| 5,425,027 | 6/1995 | Baran | 370/69.1 |

OTHER PUBLICATIONS

"Carrier Sense Multiple Access with Collision Detection (CSMA/CD) Access Method and Physical Layer Specifications", IEEE, American National Standard ANSI/IEEE Standard 802–803, 1985.

Roberts, L., "ALOHA Packet System With and Without Slots and Capture", *Computer Communications Review*, Apr. 1975.

Lam, S. S., "Packet Broadcast Networks—a Performance Analysis of the R–ALOHA Protocol", *IEEE Transactions on Computers*, vol. C–29, No. 7, Jul. 1980, 596–603.

(List continued on next page.)

*Primary Examiner*—Alpus H. Hsu
*Attorney, Agent, or Firm*—Steven R. Bartholomew; Robert B. Levy; Mark K. Young

[57] ABSTRACT

STM traffic, e.g. voice and video telephony (VT), as well as packet mode (e.g. ATM) traffic, e.g. broadcast digital video, interactive television, and data, are transmitted via a multiple access broadband fiber/coaxial cable network. Customer premises equipment (CPE) at stations, and a bandwidth controller, which may be at a head end or central office, with which all stations communicate, work together to adapt to the changing demands of the traffic mix, and efficiently allocate bandwidth to a variety of bursty and isochronous traffic sources. The bandwidth allocation defines two types of time slots, STM and ATM, and divides each frame into two corresponding STM and ATM regions. The boundary between the regions can be changed dynamically. A contention access signaling channel is provided in the STM region, for call control and set-up requests. Within the STM region, the time slots can be of variable length and be allocated on a per call basis; the length of the time slots is proportional to the bandwidth requirement of STM calls. Within the ATM region, the time slots are of fixed length, each capable of accommodating one ATM cell. Further, the fixed length ATM time slots may be reserved for a particular user for the duration of a call, or may be shared through a contention process. At least one contention ATM time slot is always made available for signaling messages related to ATM call control and set-up requests. The downstream time frame is structured in a similar manner, but includes an additional MAP field to transmit to the stations ATM time slot allocation and status information for time slots in the upstream channel.

10 Claims, 22 Drawing Sheets

OTHER PUBLICATIONS

IEEE Standard 802.6 "Distributed Queue Dual Bus Access Method and Physical Layer Specifications".

Wu, C. et al. "Extended DQRAP: A Cable TV Protocol Functioning as a Distributed Switch", *Proceedings of the 1st International Workshop on Community Networking*, Jul. 1994, pp. 191–198.

Patent application, Ser. No. 08/269,264, filed Jun. 25, 1994, entitled "Method and Apparatus Enabling Multiple Access on a Broadband Communication Network", assigned to the same assignee as the present invention.

CONSTRAINTS:

$B_S \leq Q_S$
$B_A = G_A + X_A \leq Q_A$
$B_A + B_S + U = C$ $C$ = TOTAL BANDWIDTH
$Q_S$ = LIMIT ON STM BANDWIDTH
$Q_A$ = LIMIT ON ATM BANDWIDTH
$B_S$ = CURRENT STM BANDWIDTH ALLOCATION
$B_A$ = CURRENT ATM BANDWIDTH ALLOCATION
$U$ = CURRENT UNASSIGNED BANDWIDTH
$G_A$ = CURRENT ATM GUARANTEED BANDWIDTH
$X_A$ = CURRENT ATM EXTRA BANDWIDTH

METHOD AND APPARATUS ENABLING SYNCHRONOUS TRANSFER MODE AND PACKET MODE ACCESS FOR MULTIPLE SERVICES ON A BROADBAND COMMUNICATION NETWORK

FIELD OF THE INVENTION

This invention relates generally to digital communication via a two-way high bandwidth (e.g. fiber and coaxial cable) communication medium, and, in particular, to an access protocol and arrangement for allowing competing stations connected to a common head end via a tree and branch communication network to use upstream and downstream channels to transmit to and receive from the head end, a variety of types of information, such as voice, video-telephony, data or control information that may be synchronous, asynchronous or sporadic. The invention also relates to wireless networks, which are akin to fiber/coax networks, in that mobile stations do not usually directly listen to each other, but instead depend on a base station for feedback.

BACKGROUND OF THE INVENTION

There is currently a great deal of activity directed toward enhancing the fiber-coax networking infrastructures, such as those used by cable television and telephone companies. The thrust is two-fold: enhancing the downstream capacity of the networks to support new services, and providing for significant upstream capacity for new interactive services, including telephony and data networking. Here, "upstream" refers to transmission from a station to a head end (or central office), and "downstream" refers to transmission from a head end to the stations.

Many current plans for providing upstream capability utilize the well known Time Division Multiple Access (TDMA) method of assigning bandwidth to stations that have invoked a signaling method to indicate to the head-end that they wish to transmit. However, existing versions of TDMA do not provide as much flexibility in the use of the available bandwidth as is desired. Also, TDMA allocates peak bandwidth for the entire duration of a call, and thus does not take advantage of the statistical nature of the traffic.

Existing packet data solutions also do not extend well to the broadband cable environment. Carrier Sense Multiple Access/Collision Detection (CSMA/CD), as described, for example in Carrier Sense Multiple Access with Collision Detection (CSMA/CD) Access Method and Physical Layer Specifications, published by the Institute of Electrical and Electronics Engineers, American National Standard ANSI/IEEE Std. 802.3-1985, is arranged so that stations listen to the channel for a period to determine that it is IDLE before transmitting. This type of arrangement is very inefficient in the cable environment, because of the distances involved. The propagation delay, and corresponding dead time of the channel, is much greater in cable networks than in the Local Area Networks that are file standard CSMA/CD environment.

As another example, the slotted Aloha approach described by L. Roberts in "ALOHA Packet System With and Without Slots and Capture", Computer Communications Review, April 1975, specifies a system arranged so that time is divided into a series of exact slot periods. Any station that has data may transmit at any time. When collisions occur, stations back off and retransmit according to some randomized algorithm. This approach has also been enhanced with a reservation scheme in which once a station acquires a slot, it can keep successive slots by setting a header field; the station may also signal that it has finished transmitting by changing that field. See, for example, Lam, S. S. Packet Broadcast Networks—A performance analysis of the R-ALOHA Protocol, IEEE Transactions on Computers, Vol. C-29, No. 7, July 1980, 596–603. Here again, the problem is that in the coax/fiber infrastructure under consideration, it is difficult to allow stations to directly listen to each other. Also, the unique tree and branch structure of the cable network requires that a new approach be used.

Also very important is the capability of an access protocol to serve the needs of both Synchronous Transfer Mode (STM) and Asynchronous Transfer Mode (ATM) applications. Many new applications, such as high speed data and MPEG-2 video, are likely to be transported using ATM techniques from a home or office. At the same time, applications such as voice and video telephony are likely to continue being transported using STM, for reasons of delay, error sensitivity, etc.

A technique known as DQDB, described in "IEEE 802.6: Distributed Queue Dual Bus Access Method and Physical Layer Specifications," is applicable for network spanning a metropolitan area. However, DQDB employs a dual-bus structure and requires a well-defined upstream-downstream relationship between adjacent stations. It is possible to design a system to fulfill these architectural requirements for tree and branch networks, but the scheme would be very complicated and the cost would be extremely high.

Recently, a variation of DQDB, called Extended Distributed Queuing Random Access Protocol (XDQRAP), has been proposed by C. Wu and G. Campbell, "Extended DQRAP: A Cable TV Protocol Functioning as a Distributed Switch," Proc. of 1st International Workshop on Community Networking, San Francisco. Jul. 13–14, 1994, pp. 191–198. One of the drawbacks of this proposal is that it does not support both STM and ATM techniques. In its present form, it does not accommodate bursts of varying lengths, as required for STM connections. Further, the physical layer overhead (i.e., guard band and preamble) is very high, due to the requirement of multiple request mini-slots associated with each data slot.

A patent application Ser. No. 08/269,264, filed Jun. 25, 1994 by Edmon, Li, and Sriram (Li and Sriram are also co-inventors of the present invention), entitled "Method and Apparatus Enabling Multiple Access on a Broadband Communication Network," and assigned to the same assignee as the present application, presented an access arrangement for supporting some of the ATM applications. However, that invention did not consider the presence of STM traffic, nor did it specify dynamic sharing of bandwidth involving a variety of STM and ATM applications.

Accordingly, there remains a strong need for an access protocol for broadband tree and branch networks that adapts to the changing demands of a mix of STM and ATM applications, and efficiently allocates bandwidth to a variety of bursty and isochronous traffic sources.

SUMMARY OF THE INVENTION

In accordance with the present invention, a system and technique supports STM applications, e.g. voice and video telephony (VT), as well as packet mode (e.g. ATM) applications, e.g. broadcast digital video, interactive television, and data, in the context of multiple access on broadband fiber/coaxial cable networks. Further, the present invention adapts to the changing demands of a mix of STM and packet mode applications (e.g. ATM), and efficiently allocates bandwidth to a variety of bursty and isochronous traffic sources. Because the current trend is to support packet mode applications using the ATM protocol, the following description will generally refer to ATM. However, it is to be understood that other packet mode protocols may use this invention. If the broadband network and terminals evolve to full end-to-end ATM support for all services, then the present invention will support voice, VT, and other services, all in an ATM format.

In the case of a coaxial cable or fiber tree and branch communication network, the present invention is carried out both in customer premises equipment (CPE) at stations, and in a common controller, which may be a head end with which all stations communicate. A medium access control (MAC) processor provided in each of the stations and in the common controller or head end divides the time domain for a given digital bit stream channel into a series of successive frames, each having a plurality of time slots. There are two types of time slots, STM and ATM. The frame is divided into two regions; in accordance with the present invention, the boundary between the regions can be changed dynamically. Within the STM region, variable length time slots can be allocated to calls, such as voice and video telephony, requiring different amounts of bandwidth. A contention access signaling channel is also provided in this region, for STM call control and set-up requests. Within the ATM region, the time slots are of fixed length, each capable of accommodating one ATM cell. Further, the fixed length ATM time slots may be reserved for a particular user for the duration of a call, or may be shared through a contention process. At least one contention ATM time slot is always made available for signaling messages related to ATM call control and set-up requests.

The downstream time frame is structured in a manner similar to that used in the upstream direction, but includes an additional MAP field. This field is used to communicate to the stations, ATM time slot allocations in the upstream channel. It also indicates to the stations which of the time slots, in the next upstream frame, are open or available for contention, and which are reserved for designated stations.

Because of the unidirectional architecture of the up and down communication channels, individual stations do not communicate directly with each other, but can receive downstream broadcast messages (i.e., STM messages and ATM MAP messages) indicating the status of each upstream time slot. These status messages are generated in the common controller or head end, and are transmitted in a broadcast downstream channel so that all stations can receive them.

For systems provisioned for STM traffic, one fixed length time slot in the STM region of upstream frames is always used as a shared, i.e., contention-based, STM signaling channel. Similarly, at least one time slot is always provided in the ATM region in which ATM applications can transmit call set-up related signaling messages. When an STM/ATM call arrives at a station, a signaling message is sent from the station to the head end to request call set up and bandwidth allocation. In one embodiment of the invention, STM time slots are allocated closest to the beginning of a frame, and ATM time slots are allocated closest to the end of a frame. This arrangement leaves the unassigned bandwidth in the center of the frame, i.e., between STM and ATM regions.

When an STM call terminates, a "hole" is momentarily created in the STM region. A "hole" represents released bandwidth that is currently unassigned. This is taken account of by "repacking", which refers to reallocation of time slots to existing STM calls so that all time slots for the STM calls are placed adjacent to each other and closest to the beginning of the frame. In one arrangement, repacking is accomplished immediately after termination of an STM call, and the released bandwidth is used to create additional ATM time slots. In another arrangement, the released bandwidth is added to the unassigned region of the frame, and made use of when a new call arrival occurs. In yet another arrangement, the repacking is deferred until it is determined that the released bandwidth due to several "holes" is adequate to admit a new call, but the holes are not contiguous to each other. Following a repacking action at the controller, in each of the arrangements, all stations are notified of the new STM and/or ATM time slot allocations by sending messages in the STM signaling and MAP portions of the next downstream frame.

In the ATM portion of an upstream frame, a contention/reservation process is used. Throughput and delay performance in multiple access networks with branch and tree network topologies are significantly improved by interleaving the ATM time slots within a frame structure, whereby the propagation delay constraint is overcome, and by a reservation process by which the head end allocates time slots to stations at a rate adequate to meet the delay requirement specified by the station. Further details relating to how time slots are assigned to different types of ATM calls are described below.

ATM calls can be of several types: (a) constant bit rate (ATM/CBR), (b) delay sensitive variable bit rate (ATM/VBR), (c) delay tolerant ATM/VBR, and (d) ATM/contention. An application such as voice or video telephony in ATM form could be categorized as ATM/CBR; an interactive data application is an example of delay sensitive ATM/VBR; a file transfer is an example of delay tolerant ATM/VBR; and the upstream messages for VOD and video games are examples of ATM/contention.

When an ATM call arrives at a station, the station transmits a signaling message to the head end, using an upstream ATM time slot that is available for contention, to specify the type of call. The head end applies different processes in the handling of each type of call.

ATM/CBR calls are allocated ATM time slots by the head end, in accordance with their bandwidth requirements. Delay sensitive ATM/VBR calls are allocated ATM time slots by the head end, in accordance with a statistically weighted incremental bandwidth (SWIB) determination that takes account of existing ATM/VBR traffic and the statistical characteristics of the new call request. With respect to delay tolerant ATM/VBR, the head end can receive, from the station, any information concerning burst length and delay tolerance. The head end can then assign ATM time slots at a rate that meets those requirements. For example, a station might not be assigned one slot in every frame, but rather may be allowed to transmit "m" ATM cells in every $n^{th}$ frame (m and "n" are integers).

In ATM time slots that are available for contention, the ATM/contention calls are processed in a manner similar to that used in the above cited Edmon, Li, and Sriram patent application. Thus, acknowledgment or status messages may be transmitted in a broadcast downstream channel from the common controller or head end, and indicate a particular time slot status, which can, for example, be (a) IDLE, (b) BUSY/CONTINUATION, meaning that a station has a need for continued use of a slot, (c) BUSY/FINAL, meaning that the continued use of a slot has come to an end, or (d)

COLLISION, meaning that a collision has occurred with respect to that slot. The stations respond to the status messages to determine when to transmit the next ATM cell from an ATM/contention type of call.

An additional feature of the bandwidth allocation method of this invention is that ATM traffic is assigned a minimum guaranteed bandwidth to meet a Quality of Service (QOS) requirement, which may, for example, pertain to the maximum permitted cell delay or loss ratio. Further, additional "extra" bandwidth can be assigned, if spare bandwidth is available on the channel, to as many as ATM calls as possible, to provide better than the specified QOS. In other words, given that some of the ATM traffic is bursty, such traffic may be allowed to use any spare bandwidth, in addition to its guaranteed bandwidth. However, the method of this invention allows the "extra" bandwidth to be taken away from the ATM connections to which it is assigned, and used instead to admit a new STM or ATM call. Taking away the "extra" ATM bandwidth potentially allows a new call to be admitted, but does not lower the QOS for the ongoing ATM calls below the required QOS. An example of QOS is the delay requirement specified by a variable bit rate (VBR) ATM call, such as a file transfer. If "extra" bandwidth is assigned to this call, the file transfer may complete sooner than the specified deadline, and if the "extra" bandwidth is reassigned to another call in the middle, the file transfer still completes within the specified deadline.

So far, our descriptions of bandwidth allocation and management focused only on the upstream traffic. The downstream STM and ATM time slots are assigned by the head end in accordance with the bandwidth required for each call. There are many similarities between the upstream and the downstream traffic characteristics. Therefore, some of the methods specified by this invention are applicable for handling the upstream and downstream traffic. However, some differences do exist in these methods, because there is contention access for some part of the traffic in the upstream direction, while the downstream bandwidth is shared by a combination of TDMA and statistical packet multiplexing only.

Note that in applications in which voice and video telephony traffic are transmitted in ATM form between each of the stations and the head end, all of the traffic carried in the cable distribution network may be ATM traffic. In this event, there are no STM time slots, and the present invention is nevertheless useful in optimizing the handling of a multiplicity of types of ATM traffic.

While our invention has thus far been primarily described in the context of a fiber/coax based transmission infrastructure, it is to be understood that the invention is also applicable to a wireless communications environment. In the latter situation, the terms "mobile station", "base station" and "wireless medium", would be applicable in place of the terms "station", "head end" and "fiber/coax medium".

DETAILED DESCRIPTION

Figure 1:
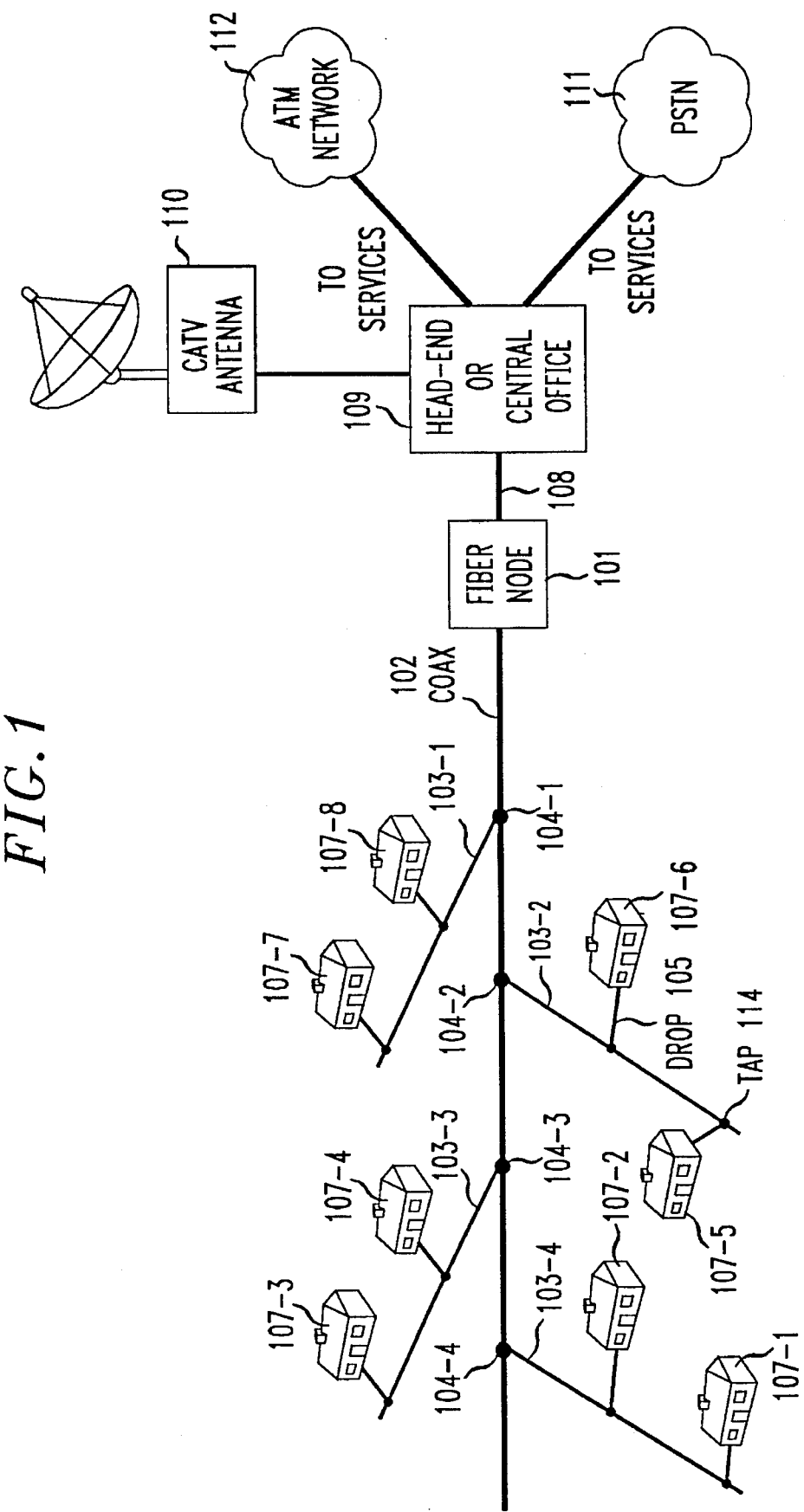
FIG. 1 illustrates the overall arrangement of a broadband network in which a plurality of stations are interconnected with a common controller called a head end, by a tree and branch transmission network, and in which the present invention may be used.

The type of broadband network in which the present invention may be used is shown in FIG. 1. A plurality of stations 107-1 to 107-8 are connected to a common head end 109 by a tree and branch transmission network. The transmission network can include a main coaxial cable 102 having a plurality of taps 104-1 to 104-4, each of which serves a corresponding feeder cable 103-1 to 103-4. Each feeder cable in turn serves one or more of the stations 107 via a tap 114 and a drop, such as drop 105. The network in FIG. 1 includes, for each serving area, a single fiber node 101 which permits a transition between main coaxial cable 102 and an optical fiber 108. However, it is to be noted that the entire network can consist of coaxial cable in some implementations, and in others, more than one such fiber node can be employed in the network, depending upon which portions of the network are fiber and which are coaxial cable.

By virtue of taps 104, which are often directional, in the tree and branch arrangement illustrated in FIG. 1, individual stations cannot communicate with or "hear" each other, and therefore, conventional access protocols cannot be used efficiently. Rather, each of the stations communicates in the upstream direction with a common controller located in a head end or central office 109, while the head end can broadcast downstream (on coax 102 and fiber 108) to all of the stations or transmit selectively to certain stations, using well known addressing techniques. In the rest of the ensuing description, the terms "common controller" or "head end" are used interchangeably, with the understanding that the common controller is located in a head end. Also, it may be noted that some implementations of the present invention may involve a central office in place of a head end. The arrangement of FIG. 1 is further assumed to include unidirectional, upstream and downstream amplifiers (not shown) that also prevent all stations from hearing all other stations. A typical network of the type shown in FIG. 1 may involve distances in a range up to 100 miles from the farthest station to head end 109.

The traffic anticipated in coax/fiber networks of the type shown in FIG. 1 can be broadly classified as analog traffic, synchronous transfer mode (STM) traffic, and asynchronous transfer mode (ATM) traffic. An example of analog traffic is the conventional analog CATV. Examples of STM traffic applications are voice, narrow-band ISDN, and video telephony, which require bursts of different length and are normally multiplexed using Time Division Multiple Access (TDMA) techniques. The ATM traffic can be further classified as (a) constant bit rate (ATM/CBR), (b) delay sensitive variable bit rate (ATM/VBR), (c) delay tolerant ATM/VBR, and (d) ATM/contention. An application such as voice or video telephony in ATM form could be categorized as ATM/CBR; an interactive data application is an example of delay sensitive ATM/VBR; a file transfer is an example of delay tolerant ATM/VBR; and upstream signaling and VCR remote control messages for VOD and button push messages for video games are examples of ATM/contention. ATM/contention traffic is essentially sporadic in nature, consisting of occasional bursts of one or more packets or cells.

Note that sometimes, delay insensitive traffic like that generated by a file transfer, may also be served using an ATM/CBR connection. Note also that VBR video can be transported through the network as ATM/VBR traffic, but it requires resynchronization at the receiving station before display on a video monitor. The asynchronous or VBR traffic is bursty, due to variations in activity/inactivity periods and potentially variable bit rates during the activity periods. Sporadic traffic is also bursty, but is characterized by relatively long inactivity periods followed by bursts of one or a few packets.

As illustrated in FIG. 1, calls requiring service beyond the area covered by head end 109 are transmitted by the head end to various service providers. These providers include Public Switched Telephone Network (PSTN) 111, ATM network 112, as well as other similar facilities, such as other wide-area networks. The CATV antenna 110 is used for reception of cable TV programming, at head end 109, which may be transmitted to stations 107 in downstream analog broadcast channels 201 on the fiber/coax transmission medium.

Figure 2:
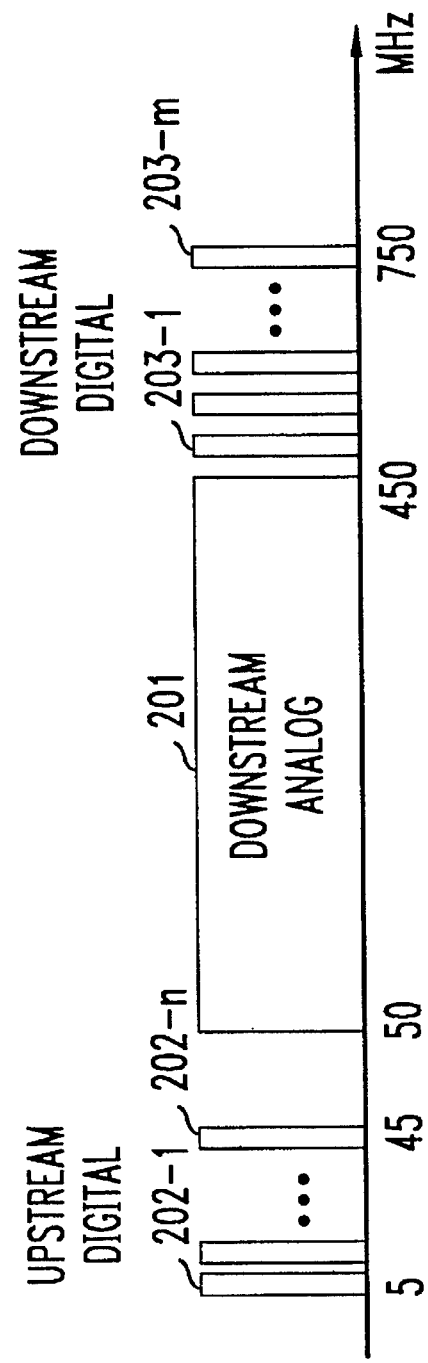
FIG. 2 illustrates an example of the upstream/downstream spectrum allocation that may be used on the transmission medium interconnecting the stations and head end shown in FIG. 1.

FIG. 2 illustrates an upstream/downstream spectrum allocation that may be used in the transmission network interconnecting stations 107 to head end 109. Assuming that a total bandwidth of at least 750 MHz is available on all of the components of the network, a 400 MHz band 201 from 50 MHz to 450 MHz may be used to carry conventional downstream analog information, such as conventional cable TV programming. A 40 MHz band between 5 and 45 MHz can be divided into a plurality of upstream digital channels 202-1 to 202-n, each of which can be 1 MHz to 6 MHz wide, and capable of carrying 1.6 Mb/s to 10 Mb/s digital bandwidth when used with a suitable modulation scheme. Each of these upstream digital channels can be used for carrying control, signaling, voice, video telephony and other messages in the upstream direction. A larger number, typically 50, of downstream digital channels 203-1 to 203-m can be included in the 300 MHz band between 450 and 750 MHz. These channels can be used for the downstream component of voice, video telephony, video on demand (VOD), and other interactive (ITV) services. Due to the lower noise in the downstream channels (as compared to the upstream channels), with suitable modulation schemes, it is possible to carry up to 28 (or even 40) Mb/s in each of the downstream channels 203-1 to 203- n. The upstream channels 202 are shared by the stations 107 using a multiple access method such as described by the present invention. The downstream channels 201 and 203 are "broadcast" channels, in that all stations 107 can receive the messages transmitted in those channels. It should be noted that the present invention can operate with any spectrum allocation and bit rates, including and other than those discussed in the context of FIG. 2.

Before describing the specific arrangement of the stations 107 (FIG. 3) and head end 109 (FIG. 4), and the specific components in upstream and downstream messages (FIGS. 5–10) exchanged between the stations and the head end, it will be instructive to present an overall view of the operation of these elements in connection with the present invention. In accordance with the principles of the present invention, bandwidth controller 335 in MAC processor 330 in stations 107 in FIG. 3, and a similar bandwidth controller 435 in MAC processor 430 in head end 109 in FIG. 4, are arranged to implement a protocol with respect to information transmission on the interconnecting tree and branch network, whereby a station 107 can insert information in a particular time slot in an upstream channel as long as the time slot is either (a) allocated to that station, or (b) a contention slot. A station where an STM call arrival occurs, initially accesses the STM signaling slot (see FIG. 7) via a contention process. Then, the head end allocates STM time slots for that station in the upstream and downstream frames (see FIGS. 8 and 9). When an ATM call arrival occurs at a station, the station transmits its call set-up messages using a contention ATM slot (see FIG. 7). For an ATM/CBR or ATM/VBR call, the head end allocates some guaranteed and possibly some "extra" ATM slots to the station, depending on its bandwidth requirement (see FIG. 12). The guaranteed and extra ATM slots are "reserved" for the ATM call until the call ends or the head end intervenes to make some re-assignments. When a station is said to have "reserved" time slots, the term reserved is used loosely, in the sense that the same number of time slots are allocated periodically over a bandwidth allocation cycle; however, it does not necessarily mean that specific time slots are allocated in fixed positions within each cycle. A bandwidth allocation cycle refers to either one frame or multiple consecutive frames over which the bandwidth allocation periodicity occurs. The "extra" ATM slots refer to extra bandwidth that is momentarily assigned to an ATM/VBR call, because of the availability of some unassigned or idle bandwidth on the link. Whenever a new STM or ATM call set-up requires some guaranteed bandwidth, some or all of the extra bandwidth can be taken away from the calls that currently have it.

The ATM/contention traffic, after going through a call admission process, does not individually get any guaranteed bandwidth allocation. Instead, such a call transmits its messages using the ATM time slots designated for "contention" by the head end (see FIG. 7). The method used for this contention process is based on that described in the previously cited patent application by Edmon, Li and Sriram (with some variations as described later in this disclosure). The downstream STM messages and the ATM MAP, containing information about reservation and contention status of ATM time slots, are transmitted in the STM signaling field 902 and ATM MAP field 920, respectively, of a downstream frame (see FIG. 9).

In the contention process, any station that tries to transmit in an ATM/contention time slot reads the status information associated with that time slot that is contained in a broadcast downstream channel. If a time slot is not reserved, a station can insert information. If a time slot is reserved for another station, the station abstains from transmitting in that time slot. If the station detects that its own transmission experienced a collision in the preceding frame, then the station attempting the transmission executes a backoff and retransmit process.

Four contention time slot conditions, which are discussed in more detail below, may be indicated in a downstream status or acknowledgment message which is part of the MAP 920 (see FIGS. 9 and 10). First, a slot may be IDLE, meaning that the slot was unused in the last frame and is available for transmission by any station. Second, the slot may be marked as BUSY/CONTINUATION, meaning that the slot was busy in the last frame and is reserved in the next frame for the same station. Third, the slot may be marked as BUSY/FINAL, meaning that the slot was busy in the last frame, but is available in the next frame for any station to contend. Finally, the time slot may be marked as COLLISION, indicating that it was corrupted because the slot did not have meaningful data due to collisions or noise.

Figure 5:
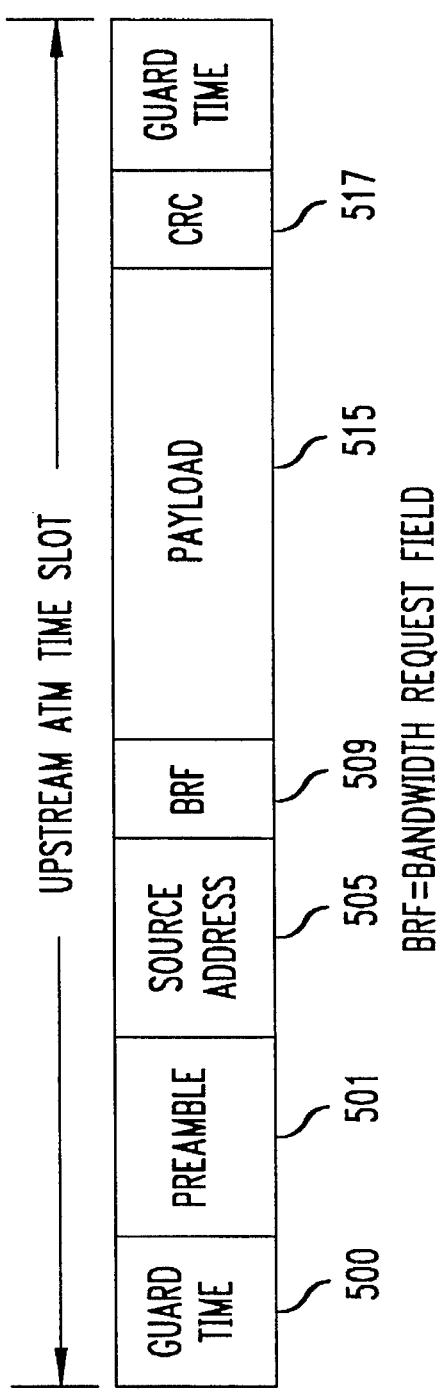
FIG. 5 illustrates the arrangement of the data fields in an upstream message contained within an ATM time slot.

Further in accordance with the invention, stations that have transmitted in a slot may set a continuation indication in the bandwidth request field (BRF) 509 in FIG. 5 in an upstream header, to indicate reservation of the same time slot in the next frame. This provides a mechanism for stations to obtain an initial contention-based access, and then reserve the same ATM contention slot over multiple frames to transmit messages that are multiple ATM cells long. However, if necessary, head end 109 can exercise overriding control over the station using the continuation indication.

Many details of the method of this invention are described via flow charts and diagrams in FIGS. 11–25. These details include specific ways of making time slots allocations for STM and ATM calls, dynamic bandwidth allocation across multiple traffic classes in the STM and ATM regions, management of the ATM/contentions traffic, bandwidth release and reallocation when calls terminate, etc.

Figure 3:
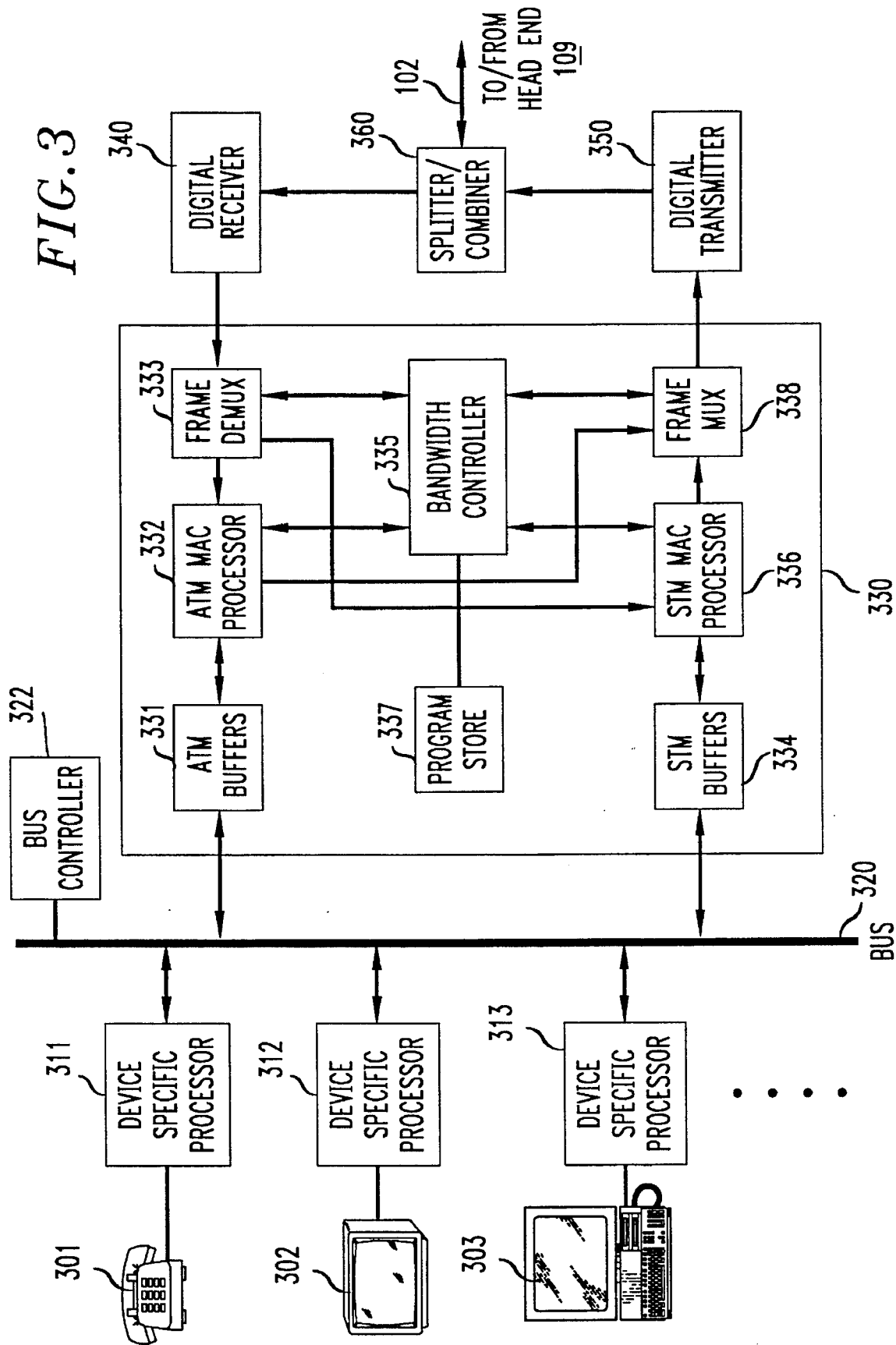
FIG. 3 illustrates the arrangement by which various communications devices in the stations of FIG. 1 are connected to the transmission network as well as the arrangement of the Medium Access Control (MAC) processor in accordance with our invention.
Figure 4:
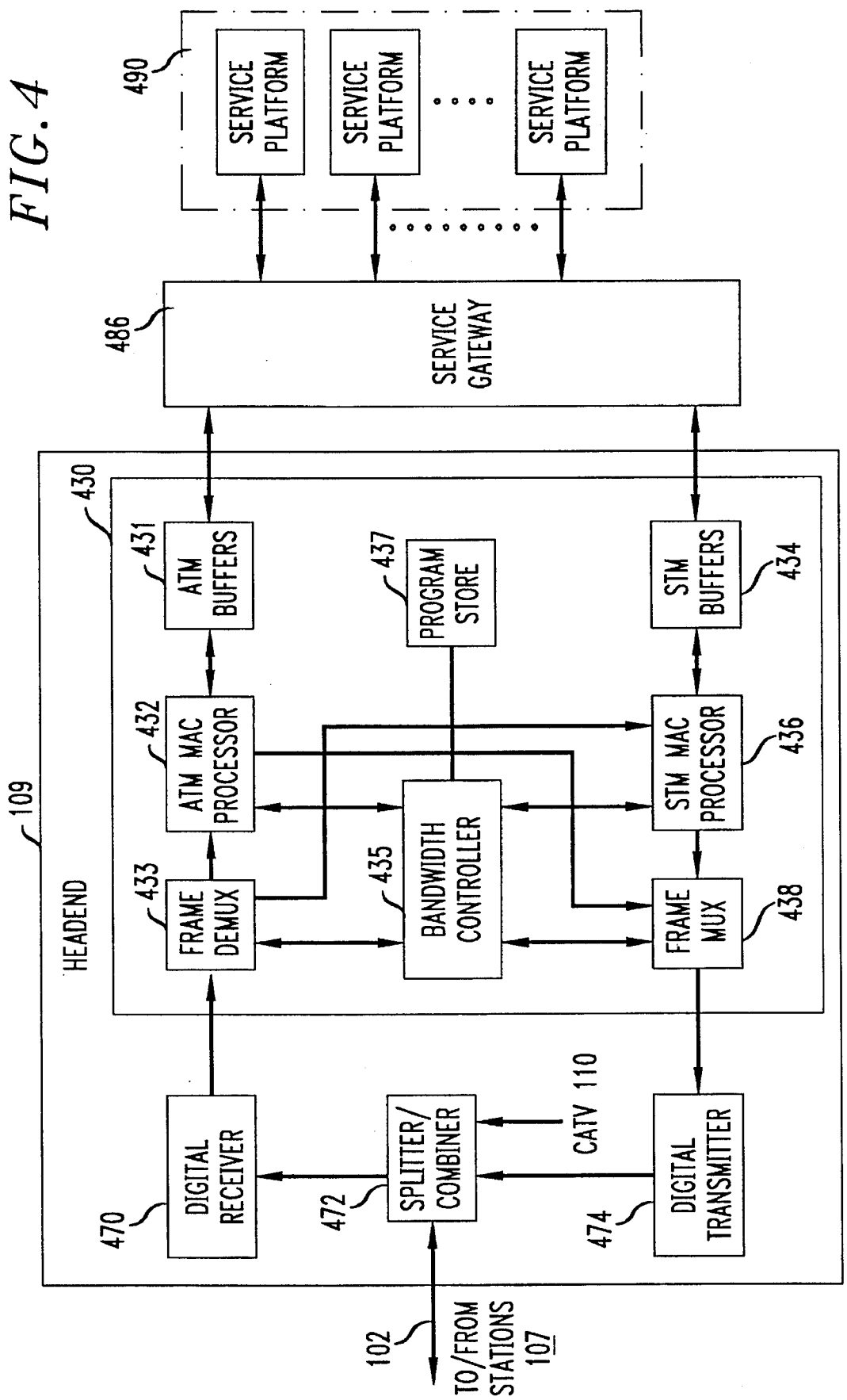
FIG. 4 illustrates the arrangement of a MAC processor similar to the one shown in FIG. 3, which is disposed in the head end of FIG. 1, and which directs communications signals between the stations and the appropriate service platforms.

Referring now to FIG. 3, there is illustrated the arrangement by which various communications devices in stations 107 of FIG. 1 are connected to the transmission network and can, in accordance with the invention, access transmission capacity in upstream channels 202 in order to communicate with head end 109. The communications devices in a station may include a telephone 301, a television 302, a computer 303, and many other devices. Each device is connected, for example, to a common bus 320 via an associated device specific processor 311–313. Thus, telephone 301 is coupled to bus 320 via processor 311, which, for example, converts PCM voice to analog signals; television 302 is coupled to bus 320 via processor 312, which, for example, converts an MPEG-2 digital TV signal to an analog signal; and computer 303 is coupled to bus 320 via processor 313 which, for example, provides conversion between user and network protocols.

With respect to upstream information, each of the device specific processors 311–313 processes the data originated in its associated communication device, and presents the data in the proper form for application to a digital transmitter 350 that enables a connection to cable 102 via a splitter/combiner 360. With respect to downstream information, each of the device specific processors 311–313 processes data destined for display/play-out at the associated communications device (telephone 301, television 302, computer 303, etc.). For example, processor 312 connected to television 302 may do MPEG-2 decoding of video information.

Transfer of data between bus 320 and a media access control (MAC) processor designated generally as 330 (described in more detail below), as well as between device specific processors 311–313 and bus 320, is performed under the control of a bus controller 322. Bus 320 and bus controller 322 may be arranged to use a standard time slot interchange (TSI) or Ethernet protocol, or any other suitable arrangement that will be apparent to a person skilled in the art.

A digital transmitter 350 and a digital receiver 340 are provided in each station to modulate upstream information and demodulate downstream information, respectively. For example, digital receiver 340 and transmitter 350 may be arranged to convert an analog signal to a digital bit stream (and vice-versa) using any of the well known techniques such as QPSK, QAM, etc. Splitter/combiner 360 operates in both directions; it extracts the signal received from head end 109 on coax 102, and feeds it to digital receiver 340, and inserts information received from digital transmitter 350 and CATV antenna 110 into the coax spectrum for transmission to head end 109. It is to be noted here that the functions performed by receiver 340, transmitter 350 and splitter/combiner 360, and potentially MAC processor 330, can be included or embodied in a single unit, sometimes referred to as a "Network Interface Unit".

In accordance with the present invention, information originating in any of the communications devices 301–303 connected to bus 320 and destined for the head end 109 of FIG. 1 is applied to cable 102 and to the other components of the transmission network under the control of MAC processor 330, which implements the MAC layer protocol of the present invention. Likewise, downstream information from head end 109 that is destined for the devices 301–303 is received from the transmission network and cable 102, also under the control of MAC processor 330. The elements of MAC processor 330 are a frame demultiplexer 333 and a corresponding frame multiplexer 338, both of which operate under the control of a bandwidth controller 335. ATM and STM buffers 331 and 334, ATM and STM MAC processors 332 and 336, and a program store 337 that contains the program or software code that controls the operation of bandwidth controller 335.

Frame demux 333 reads the appropriate ATM and STM time slots in downstream frames (see FIG. 9), and sends them to the ATM and STM MAC processors 332 and 336. The ATM MAC processor 332 sorts received ATM cells destined for station 107 from other traffic, and then separates payload data and the MAP messages (920 in FIG. 9) sent from head end 109, and sends them to ATM buffers 331 and bandwidth controller 335, respectively. From ATM buffers 331, the payload data is sent to the appropriate device specific processor 311–313 over bus 320, depending upon the destination address for the communications device 301–303 that is contained in the message. For the upstream traffic, ATM MAC processor 332 processes the information from devices 301–303, and puts it in an ATM format with the appropriate MAC layer overhead (see FIG. 5), and presents the same to frame mux 338. Frame mux 338 performs the inverse operation relative to frame demux 333, writes the ATM and STM messages into the appropriate ATM and STM time slots, respectively, in upstream frames, using information received from the bandwidth controller 335. The control/status messages are described below in connection with FIGS. 5–10.

Both frame mux 333 and demux 338 operate in conjunction with bandwidth controller 335, which performs processes that include (a) scheduling transmission of ATM cells or STM bursts from buffers 331 and 334 via ATM and STM MAC processors 332 and 336 to frame mux 338, and from frame mux 338 to digital transmitter 350, and (b) coordinating the STM and ATM MAC processors. ATM MAC processor 332 performs actions such as (a) generating call set-up requests when calls are generated by devices 301–303, (b) controlling the contention access process, (c) following the instructions of the bandwidth controller to schedule ATM traffic, and accordingly sending ATM cells from the ATM buffers 331 to frame mux 338, (d) receiving and forwarding data in downstream ATM cells to device specific processors 311–313, and (e) generating and checking cyclical redundancy codes (CRC's) for upstream and downstream ATM traffic, respectively. STM MAC processor 336 performs processes similar to ATM MAC processor 332, with some differences as required for the STM traffic by the overall MAC protocol of the present invention. The details of these processes, which, as stated previously, are performed under the control of software programs stored in a program store 337, are described below in connection with FIGS. 12 through 25. The actions in bandwidth controller 335 are coordinated with those in bandwidth controller 435 in head end 109 to perform the processes described in FIGS. 12 through 25. Buffers 331 and 334 are arranged to store ATM and STM payload data on a temporary basis, and to store parameter information used in the bandwidth allocation and management processes that form part of the MAC protocol.

FIG. 4 illustrates the arrangement of a MAC processor 430, which is similar to MAC processor 330 shown in FIG. 3. MAC processor 430 is disposed in head end 109 of FIG. 1, and directs communications signals from stations 107 to appropriate service platforms 490. As shown in FIG. 4, signals received from stations 107 via coaxial cable 102 are applied to splitter/combiner 472, which, like unit 360, extracts the upstream signals from coax 102 and presents those signals to digital receiver 470. Splitter/combiner 472 also inserts signals received from digital transmitter 474 onto the coax 102 for transmission to stations 107. Digital receiver 470 may also provide COLLISION or IDLE status detection, by using (a) power level analysis, and/or (b) digital error detection, and/or (c) other techniques. If these functions are performed in digital receiver 470, the resulting control signals are communicated to the ATM and STM MAC processors 432 and 436.

Frame demux 433 reads the appropriate ATM and STM time slots in upstream frames (see FIGS. 7,8) and sends them to ATM and STM MAC processors 432 and 436. ATM MAC processor 432 separates payload data and the signaling messages sent from stations 107, and sends them to ATM buffers 431 and bandwidth controller 435, respectively. ATM MAC processor 432 also distinguishes between reservation and contention ATM cells, and processes them differently, in accordance with the methods specified in FIGS. 12–25. A call set-up request is processed by negotiation between MAC processor 430, service gateway 486, and service platform 490, and thus a connection is established between a station and a service platform. After call establishment, the payload data from ATM buffers 431 are sent to the appropriate service platforms 490 via the service gateway 486.

For the downstream traffic, ATM MAC processor 432 processes information, which pertains to an ATM call and is received from a service platform 490, and puts it in an ATM format (if not already in that format ) with the appropriate MAC layer overhead (see FIG. 6), and presents the same to frame mux 438. Frame mux 438 performs the inverse operation relative to frame demux 433; it writes ATM and STM information into the appropriate time slots assigned to ATM and STM calls, and the control/status messages into the MAP field in the downstream frame (see FIG. 9). The insertion of information messages into specific time slots of a downstream frame occurs in accordance with time slot allocations made by bandwidth controller 435, and communicated to the STM and ATM processors 436 and 432. The control/status messages are described below in connection with FIGS. 5–10.

Both frame mux 438 and frame demux 433 operate in conjunction with bandwidth controller 435 and ATM & STM MAC processors 432 and 436. The tasks accomplished by the bandwidth controller 435 are: (a) call admission control and bandwidth allocation on the fiber/coax in upstream and downstream directions, (b) scheduling transmission of ATM cells or STM bursts from buffers 431 and 434 via ATM and STM MAC processors 432 and 436 to frame mux 438, and from frame mux 438 to digital transmitter 474, and (c) coordinating the STM and the ATM MAC processors 436 and 432. ATM MAC processor 432 performs actions such as (a) generating ATM call set-up requests when calls are generated by a network (111, 112 in FIG. 1) via service platforms 490, (b) controlling the ATM contention access process and generating acknowledgments for inclusion in downstream MAP 920, (c) following the instructions of bandwidth controller 435 to schedule ATM traffic, and accordingly sending ATM cells from the ATM buffers 431 to frame mux 438, (d) receiving and forwarding data in upstream ATM cells to service gateway 486 via ATM buffers 431, (e) generating and checking cyclic redundancy codes (CRC's) for downstream and upstream ATM traffic, respectively. STM MAC processor 436 performs processes similar to ATM MAC processor 432, with some differences as required for the STM traffic by the overall MAC protocol of the present invention. The details of these processes, which, as stated previously, are performed under the control of software programs stored in a program store 437, are described below in connection with FIGS. 12 through 25. Buffers 431 and 434 are arranged to store ATM and STM payload data on a temporary basis, and to store parameter information used in the bandwidth allocation and management processes that form part of the MAC protocol.

Service gateway 486 shown in FIG. 4 maintains information regarding subscribers, service providers, and routing information for their services platforms, and provides an interface between MAC processor 430 and service platforms 490. These service platforms can be located at separate sites apart from head end 109, and therefore illustratively are interconnected with gateway 486 via a public switched telecommunications network (PSTN) 111 or an ATM network 112 (see FIG. 1). Gateway 486 operates in conjunction with the MAC processor to recognize the needs of different applications originating from stations 107, and routes communications signals corresponding to these different applications to appropriate ones of the service platforms 490. For example, video on demand (VOD) requests originated in a station 107 would be routed through service gateway 486 to a VOD service platform, while voice calls would be routed through the gateway 486 to a LEC switch, which acts as a different type of service platform for voice calls.

Referring to FIG. 5, the basic arrangement of the data contained in a time slot is shown. A preamble 501 allows synchronization of the receiver in head end 109 to the time slot. A source address (SA) 505 allows head end 109 to identify the particular station, communications device 301–303 or device specific processor 311–313 from which the transmission originated. A bandwidth request field (BRF) 509 generally contains information about the bandwidth requested by a call. BRF field 509 may be an actual bandwidth requirement value, or it may specify the type of call based upon which the head end makes a decision regarding the bandwidth assignment for that call. Stations transmitting contention traffic may set a subfield in BRF field 509, referred to as continuation bit, to a value "one", to indicate a request for use of the same time slot in the next frame. When the station does not need that contention time slot in the next frame, it sets the continuation bit to a value "zero".

Although not limited to any particular protocol, the payload 515 in a time slot can accommodate an Asynchronous Transfer Mode (ATM) cell, which is 53 octets long. A Cyclic Redundancy Code (CRC) 517 is used for the purpose of error detection and correction, and covers all of the slot user data in a manner that would be well known to persons skilled in the art. The use of CRC 517 is optional, i.e., not always required in the implementation of this invention.

Finally in FIG. 5, a guard time 500 is included in each time slot, at the beginning and end of the time slot, to allow for transmitter turn-on/off times, and time differences caused by propagation delay as messages are carried by the transmission medium from station 107 to head end 109. All stations 107 on the coaxial cable 102 initially go through a coarse ranging process with head end 109, so that they have the same view of timing with respect to the time slots that appear on the transmission medium provided by coaxial cable 102 and fiber 108. This timing synchronization, which is performed in accordance with techniques well known to persons skilled in the art, is then fine tuned with the help of the guard time 500 and preamble 501 within each time slot. The preamble 501 is a preset digital sequence which allows the head end digital receiver 470 to rapidly acquire clock and synchronization information. All of this allows stations 107 to stay synchronized with the slot boundaries on the transmission medium, while accounting for their distances from each other and head end 109, and the corresponding propagation delays.

Figure 6:
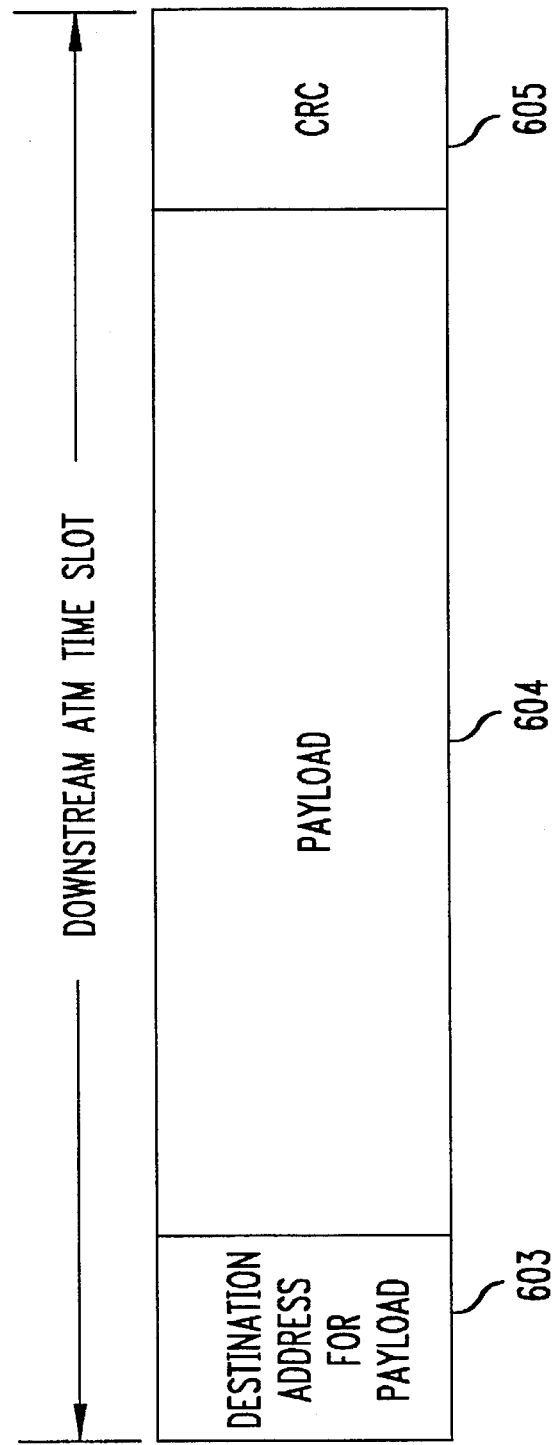
FIG. 6 illustrates the arrangement of the data fields in an downstream message contained within an ATM time slot.
Figure 9:
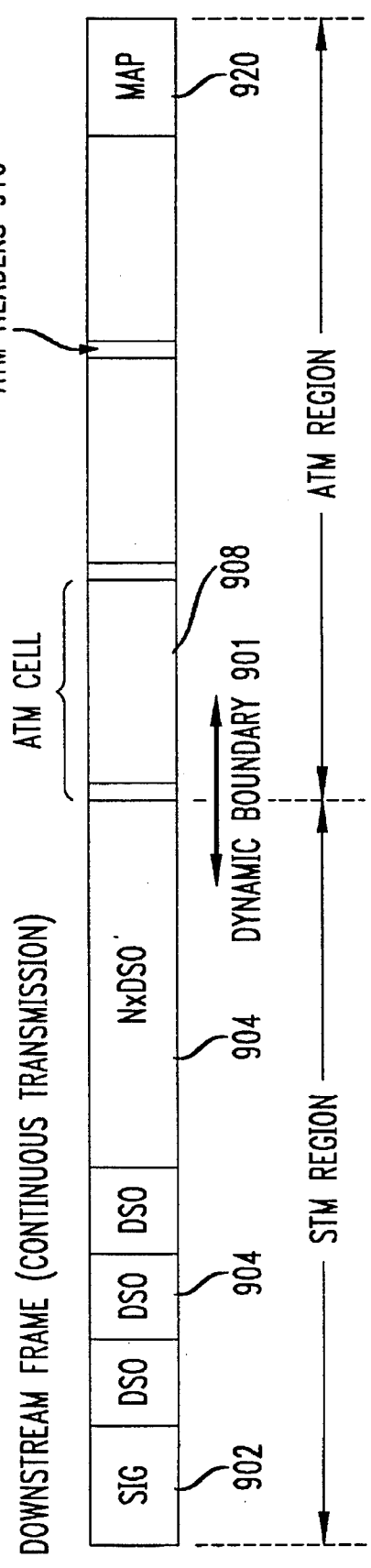

Referring to FIG. 6, there is shown the arrangement of the data fields in a downstream message contained within an ATM time slot 908 of a downstream frame (see FIG. 9). Field 603 contains the destination address for the payload in the time slot, and field 604 contains the payload. Finally, field 605 contains a cyclic redundancy code, used for error detection (and correction) purposes. The use of CRC 605 is optional, i.e., not always required in implementation of this invention.

Figure 7:
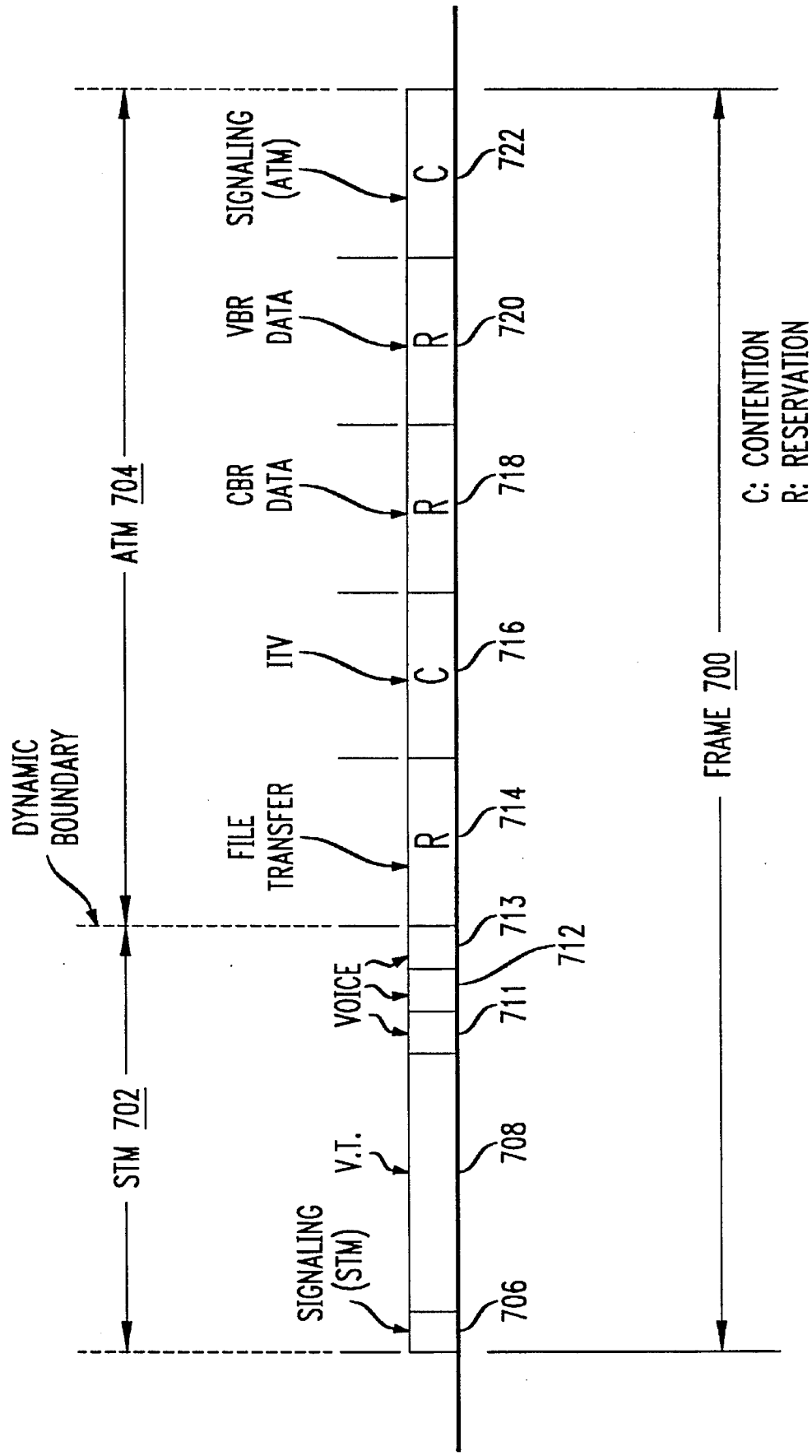
FIG. 7 illustrates a typical arrangement of different traffic types within an upstream time frame.

FIG. 7 shows the time slot allocations in an upstream frame 700 at a typical instant. This figure also illustrates the different types of STM and ATM services that are supported by the access method of this invention. In the STM region 702, STM signaling is contained in time slot 706, which is shared by contention access by all stations 107 for STM call signaling. Once bandwidth is allocated by head end 109, an STM call makes use of a periodic time slot allocation in each frame. For example, in FIG. 7, a video telephony (VT) call, requiring 384 Kbps bandwidth, uses a relatively long time slot 708, while three separate voice calls, each requiring 64 kb/s, use somewhat narrower time slots 711, 712, and 713.

Also in FIG. 7, the ATM region 704 of the frame 700 is partitioned into several ATM time slots, each capable of accommodating one ATM cell. These cells are labeled as "R" (Reservation) or "C" (Contention), corresponding to the mode in which they are being used in this frame and as dictated by the head end bandwidth controller 435. An ATM/CBR data call requiring a guaranteed fixed bandwidth uses a reservation time slot 718. Such time slot is made available to the call in a periodic manner to provide a fixed bandwidth for the duration of the ATM/CBR call. An ATM/VBR delay sensitive call also uses a reservation time slot 720. However, this time slot may not be reserved for the entire duration of the call. Instead, it may be reserved only for a burst of data (i.e., group of ATM cells) that is currently being generated by the ATM/VBR source. Time slot allocations for this burst is requested in an upstream ATM/contention time slot such as signaling time slot 722, and the allocation acknowledgment is received in the next downstream ATM MAP 920 (see FIG. 9). When this burst is transmitted completely, the periodic allocation of the time slot 720 is terminated for this ATM/VBR call. When the same ATM/VBR source produces another burst of data at a later time, the source would then seek allocation of a new reservation ATM time slot (periodic over one or more frames). An ATM/VBR delay insensitive call, such as a file transfer, also uses a reservation time slot 714. Due to its delay insensitive nature, a file transfer call may be assigned only one ATM time slot in every $n^{th}$ frame where "n" may be large.

In FIG. 7, interactive TV (ITV) and ATM signaling traffic use contention time slots 716 and 722. ATM signaling traffic corresponds to ATM call set-up related messages. Examples of ITV are upstream remote control signals from video on demand (VOD) or button push signals in a video game. Although not shown in FIG. 7, if more than one station transmit in a contention time slot simultaneously, a collision would result, and then the stations would apply a contention resolution scheme.

Figure 8:
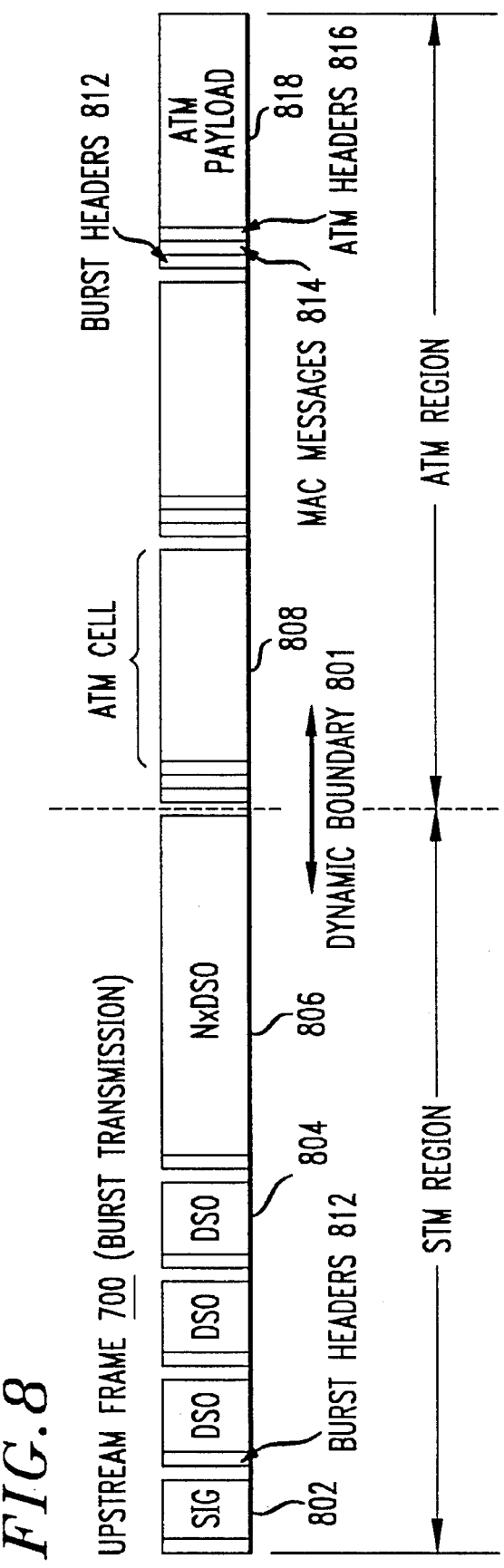
FIGS. 8 and 9 illustrate further details of typical arrangements of upstream and downstream time frames, respectively, and, in particular, show the positions of headers and other frame signaling messages.

Now referring to FIGS. 8 and 9, it may be noted that in the upstream direction, stations 107 transmit in a "burst" transmission mode, and in the downstream direction, head end 109 transmits in a "continuous" transmission mode. The stations go through a ranging process and transmit or "burst" based on timing information received from the head end. Each station uses guard times and preambles (see FIG. 5) to avoid interference with adjacent time slots in which another station may transmit. However, in the downstream direction, the transmission channel is controlled and used only by head end 109. Therefore, there is no need for guardtimes or preambles, and the transmission takes place in continuous way.

In FIG. 8, there is shown an upstream frame 700, similar to that of FIG. 7, showing overheads associated with STM and ATM time slots. Associated with each ATM and STM time slot is a burst header 812, which includes guard time 500 and preamble 501 shown in FIG. 5. Burst header 812 is typically of the same size, whether it is an STM burst of a signaling message 802, or a DS0 804, or an N×DS0 806 call, or a burst corresponding to an ATM cell transmission 808. The source address 505 and BRF 509 of FIG. 5 constitute the MAC message 814 in an ATM burst (FIG. 8). The payload in an ATM burst is an ATM cell, which consists of an ATM header 816 and an ATM payload 818. The boundary 801 between the STM and ATM regions is movable or dynamic, depending on arrivals and departures of STM and ATM calls. Certain rules for the movement of this boundary are explained below, in the context of FIGS. 12 through 25.

In FIG. 9, there is shown a downstream frame. The STM region (to the left of boundary 901) consists of time slots corresponding to STM signaling 902, DS0 904 (e.g. voice) and N×DS0 906 (e.g. video telephony), and the ATM region (to the right of boundary 901) consists of one or more ATM cells 908 which include headers 916. MAP field 920 carries control and status information from the head end 109 to the stations 107. It indicates the status of contention time slots in the previous frame and also informs stations of the bandwidth (or time slot) allocations in the next upstream frame.

The boundary between the STM and ATM regions of the frame shown in FIG. 9 is dynamic in a manner similar to that described above for the upstream frame in FIG. 8. The locations of the boundaries in the upstream and downstream frames are each determined independently by the bandwidth allocation decisions made in the head end 109.

Figure 10:
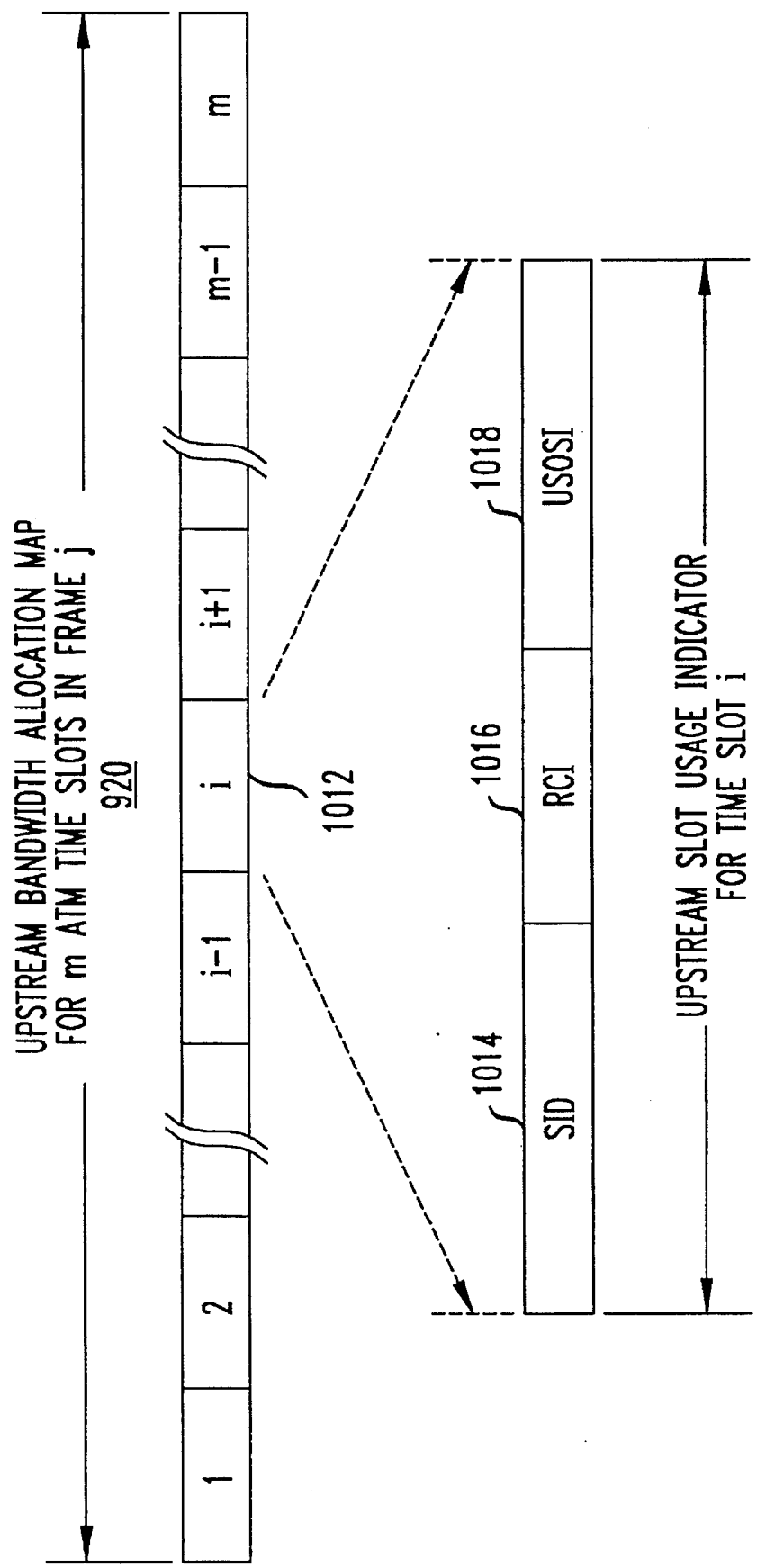
FIG. 10 illustrates the details of the MAP field shown in FIG. 9.

Now referring to FIG. 10, there is shown the contents of a MAP field 920. If there are "m" ATM slots in the ATM region of a frame, there would be "m" segments 1012 in the MAP field, each of which corresponds to one ATM time slot in the downstream frame. As mentioned earlier in this disclosure, the ATM slots are located as close to the end of a frame as possible. Accordingly, the $m^{th}$ ATM time slot is closest to the end of a frame, the $(m-1)^{th}$ time slot is the second closest to the end of a frame, and so on. The number "m" may change from one frame to the next but the length of the MAP field provides that information to the stations. The fields within a segment 1012 of the MAP are also shown in FIG. 10.

The SID field 1014 in the $i^{th}$ segment 1012 provides the station ID of the station which either had a successful transmission (via contention access) in the previous corresponding time slot, or to which the time slot in the next frame is allocated by head end 109 via a reservation process. The Reservation/Contention Indicator (RCI) field 1016 indicates whether the slot is reserved ("R") or open for contention ("C"). The Upstream Slot Occupancy Status Indicator (USOSI) field 1018 has different meanings depending on the value of the RCI field 1016 in the same segment 1012. The head end can change the value of the RCI field from C in one frame to R in the next frame or viceversa. In the case of a contention slot (RCI=C), the USOSI 1018 indicates one of the following conditions: (a) IDLE, (b) COLLISION (or equivalently noise), (c) BUSY/RESERVED, (d) BUSY/FINAL. The definitions of these conditions are similar to those stated in the earlier cited reference (Edmon et al.). When the RCI value is R, i.e., the time slot is reserved, then the USOSI field may be left unused in some implementations. However, in another implementation of this invention, the USOSI 1018 may be used to inform the station of any additional parameters associated with bandwidth allocation and control. For example, the head end may indicate to the station about the actual bandwidth allocated, i.e., the periodicity and number of ATM cells that will be allocated in the frames that will follow.

In the above description, it was stated that the ATM MAP 920 information is of variable length depending on the number of the ATM time slots in an upstream frame. In another realization of this invention, a fixed length MAP 920 (in FIGS. 9 and 10) can be used. In such a realization, MAP 920 can always have a fixed number of segments corresponding to the largest anticipated value of "m" (see FIG. 10). For cases when one or more of the segments 1012 are not meant to contain valid MAP information (i.e., when "m" is smaller than the its largest anticipated value), then a special value in the SID field will indicate that the said segment 1012 is invalid and to be ignored (i.e., there is no ATM time slot corresponding to that segment). A fixed length MAP designed and used in this manner may be desirable in some systems that use the present invention.

Figure 11:
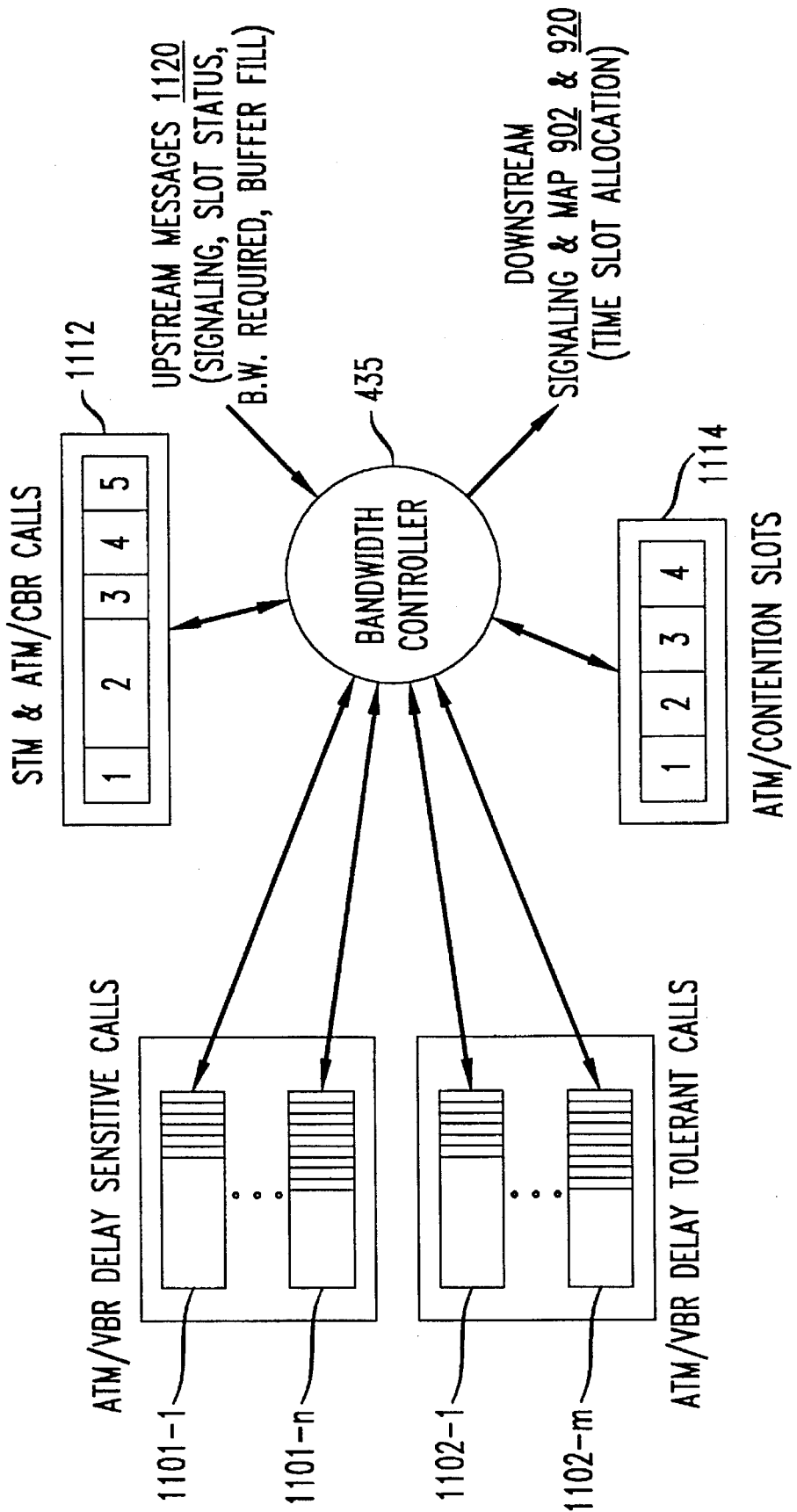
FIG. 11 illustrates, conceptually, the information maintained in the bandwidth controller located in the head end, for the purposes of bandwidth allocation and management.

In FIG. 11, there is shown the schematic diagram of the view maintained within bandwidth controller 435 at head end 109 for the purpose of bandwidth allocation and call admission decisions. Bandwidth controller 435 (a) receives upstream messages, such as messages contained in fields 706 and 722 of FIG. 7, and in field 814 of FIG. 8, which include ATM and STM call setup signaling messages, bandwidth requirements for each call, and buffer fill values at each station 107, and (b) generates downstream signaling messages such as those contained in STM signaling field 902 and ATM MAP 920 of FIG. 9. Based on the information in the upstream messages, bandwidth controller 435 maintains status related to different types of calls. The STM and ATM/CBR calls require different amounts of fixed bandwidth for the duration of a call and, accordingly, the bandwidth allocations of these calls is maintained in register 1112. In registers 1101-1 through 1101-n, buffer fill status of the active ATM/VBR delay sensitive calls is maintained. Similarly, in registers 1102-1 through 1102-m, buffer fill status of ATM/VBR delay tolerant calls is maintained. The number and status of stations using ATM contention time slots is maintained in register 1114. The registers shown in FIG. 11 may be part of the bandwidth controller, or they may reside in the ATM and STM buffers 431,434 (see FIG. 4).

Based on this overall view of different types of calls maintained in the different registers, bandwidth controller 435 makes time slot allocation decisions for the next frame or the next several flames. These time slot allocation decisions are communicated in a downstream channel to each of the stations via downstream signaling 902 and MAP 920 fields in a downstream frame (see FIG. 9). The processes used in bandwidth controller 435 for time slot allocation decisions are described in the flowcharts of FIGS. 13 through 25.

Figure 12:
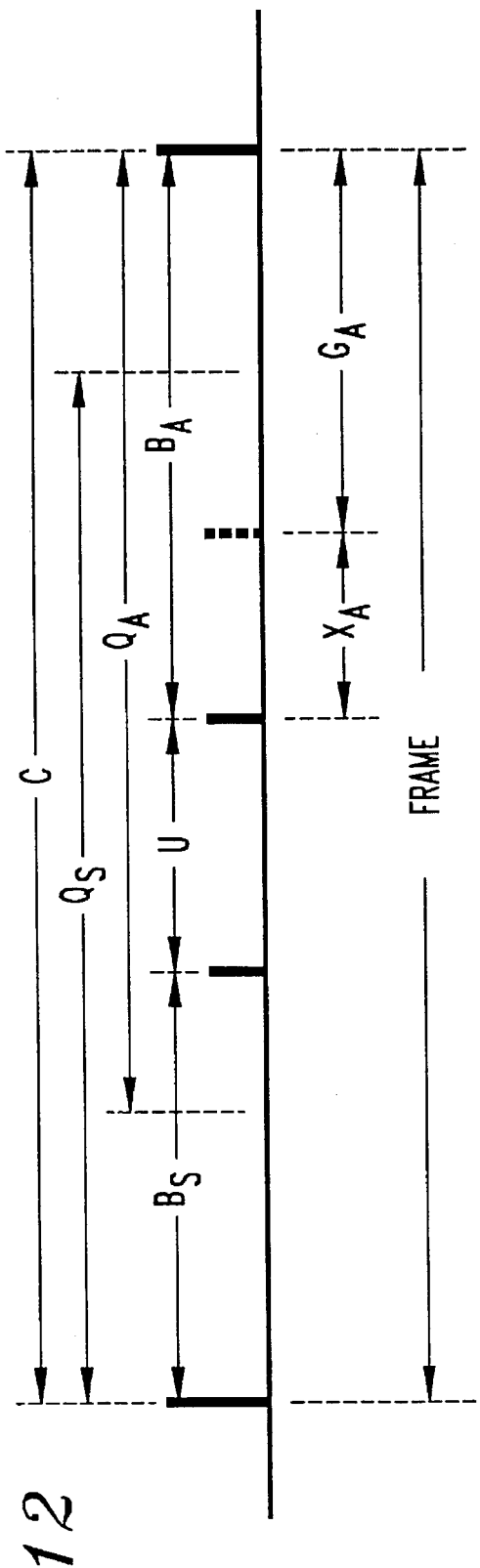
FIG. 12, which is similar to FIG. 7, illustrates the designations for various regions within each time frame and indicates certain constraints on these regions.

In FIG. 12, there are shown the various regions and boundaries corresponding to STM and ATM connections within a frame. In this figure, the different symbols represent the bandwidth allocation parameters. The parameter C represents the overall bandwidth in a channel, and is proportional to the duration of a frame. The parameters $B_S$ and $B_A$ represent the bandwidth allocations for the STM and ATM regions, respectively. The parameter U represents the unassigned bandwidth. The parameters $Q_S$ and $Q_A$ represent the maximum limits on $B_S$ and $B_A$, respectively. The parameters $G_A$ and $X_A$ represent the guaranteed and extra bandwidth allocations for the ATM calls. All these parameters are illustrated in FIG. 12 relative to a frame, because the bandwidth allocations are proportional to the corresponding lengths of the regions within a frame (in terms of time). The process flow diagrams of FIGS. 13–25 make use of the notations of FIG. 12 to describe the actions performed at each step. It is to be understood that the following constraints $B_S < Q_S$ $B_A = G_A + X_A < Q_A$ $B_A + B_S + U = C$ are always satisfied in the flow diagrams of FIGS. 13–25, although they may not be shown explicitly in each diagram.

Figure 13:
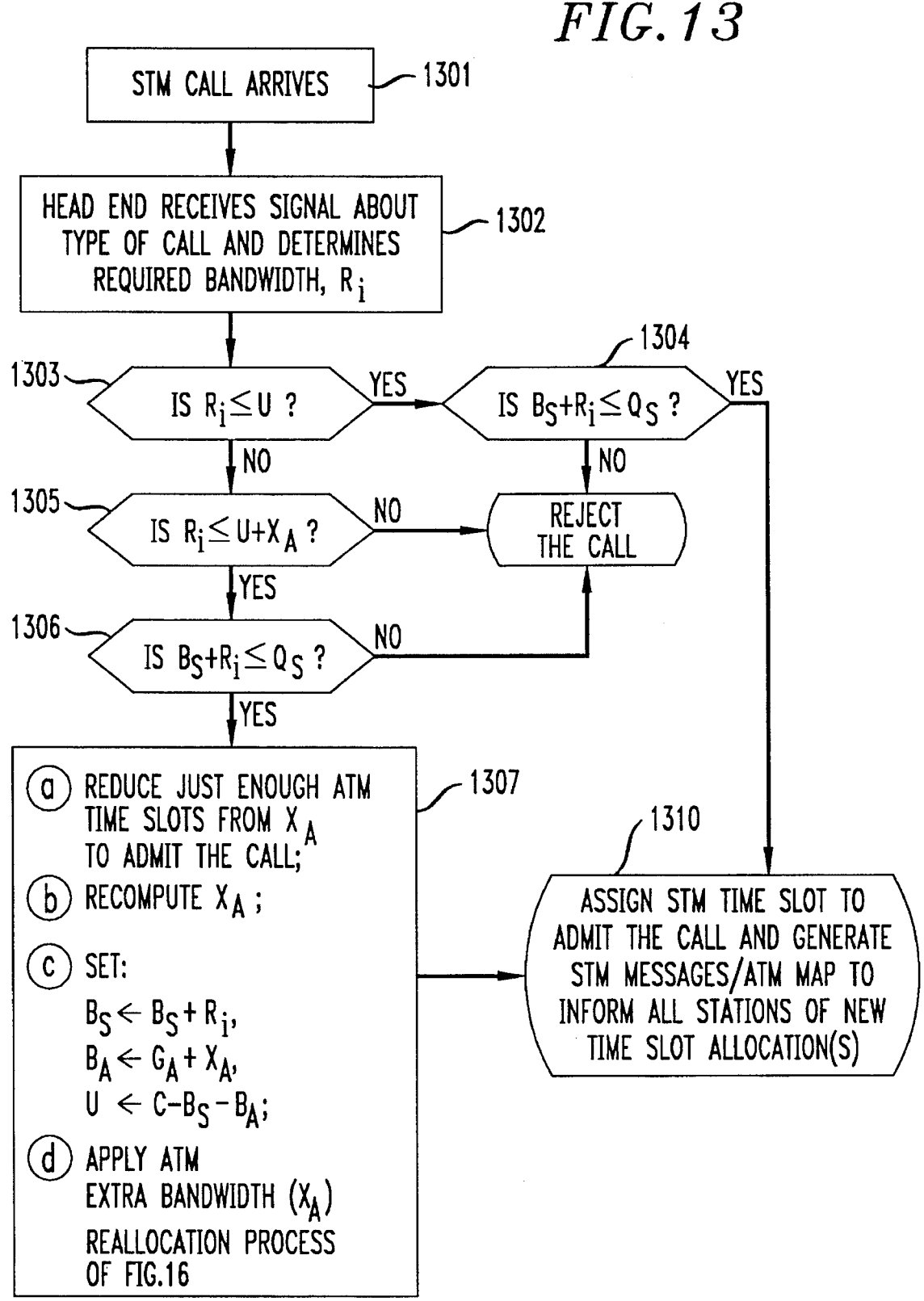
FIG. 13 is a process diagram illustrating how an STM call arrival is processed at the head end.

FIG. 13 shows the process associated with STM call admission and bandwidth allocation, which is followed in the bandwidth controller 435 and STM MAC processor 436 (see FIG. 4) in head end 109. Following the arrival of an STM call at step 1301, head end 109 receives a signal about the type of call and determines its required bandwidth, $R_i$, at step 1302. A decision is made at step 1303 to determine if the call can be admitted using the currently unassigned bandwidth. If the result is yes, then a determination is made at step 1304 to check whether or not the limit on total STM bandwidth is still satisfied after admitting the call. If the result at step 1304 is positive, then in step 1310, an STM time slot is allocated to the call, and a corresponding STM message is transmitted to the station which originated, or which is to receive, the call. If the result at step 1303 is negative, then at step 1305 a determination is made to check if the call can be admitted by adding the current extra ATM bandwidth to the unassigned bandwidth. If the result at step 1305 is positive, then the constraint on the maximum STM bandwidth is checked in step 1306, and if the result is still positive, then a decision is made to admit the STM call and the process proceeds to step 1307. If the result at step 1306 or 1305 or 1304 is negative, then the call is rejected.

Figure 16:
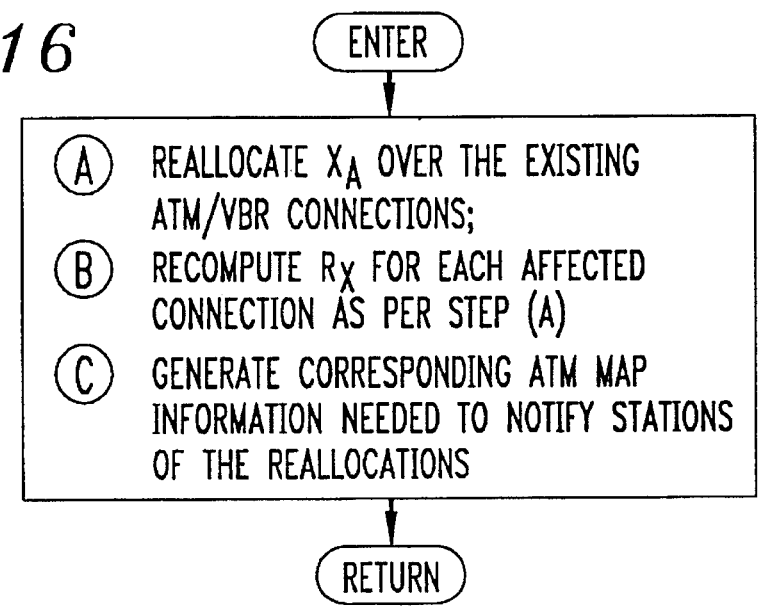
FIG. 16 is a process diagram illustrating how ATM extra bandwidth is reallocated.

At step 1307, the process proceeds in the following manner: (a) first, just enough ATM time slots from the $X_A$ region of the frame are taken away to create the necessary bandwidth for the STM call (i.e., making use of U and as much of $X_A$ as needed), (b) the value of $X_A$ is updated, (c) the values of the STM, ATM and unassigned regions (i.e., $B_S$, $B_A$, and U) are updated, (d) the process of FIG. 16 is applied to reallocate the modified ATM extra bandwidth to existing ATM/VBR calls. The process proceeds from step 1307 to step 1310, where an STM time slot is allocated to the call, and STM messages and ATM MAP are generated to inform all stations of the new time slot allocations.

Figure 14:
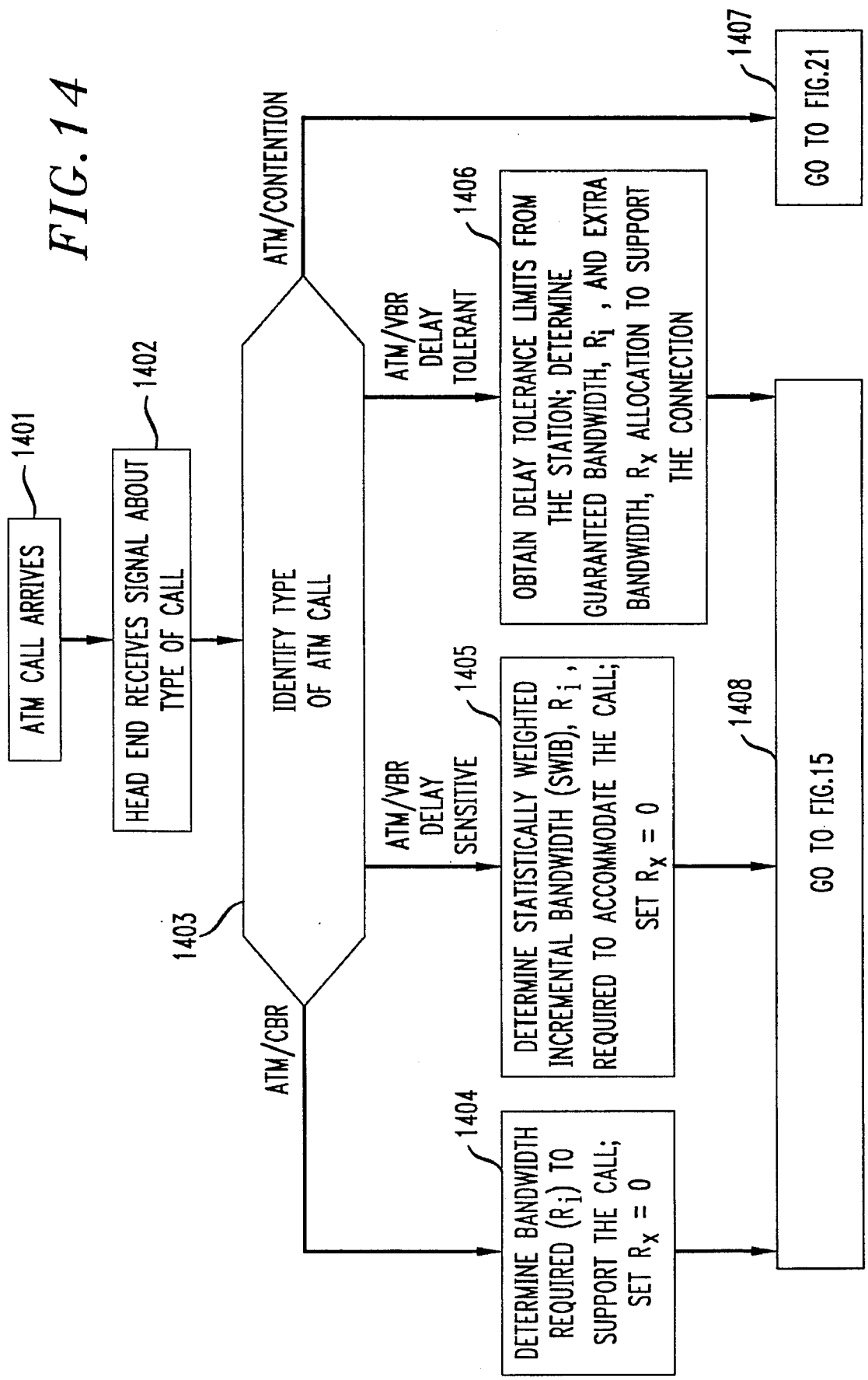
FIG. 14 is a process diagram illustrating how different types of ATM calls are identified and preprocessed; this diagram should be read in conjunction with FIGS. 15 through 21.

FIG. 14 shows the process associated with ATM call admission and bandwidth allocation which is followed in the bandwidth controller 435 and ATM MAC processor 432 (see FIG. 4) in head end 109. Following the arrival of an ATM call at step 1401, head end 109 receives a signal about the type of call at step 1402. Based on the signaling information received in step 1402, the head end identifies the type of ATM call in step 1403. There are four possible outcomes associated with step 1403. If the type of call is identified at step 1403 as ATM/CBR, then the process proceeds to step 1404, where the bandwidth required, $R_i$, to support the call is determined based on the signaling information received at step 1402. No extra bandwidth is required for an ATM/CBR call, and therefore the extra bandwidth allocation parameter, $R_x$, for the call is set to zero. If the type of call is identified at step 1403 as ATM/VBR delay sensitive, then in step 1405, a bandwidth parameter known as statistically weighted incremental bandwidth (SWIB) is determined, and $R_i$ is set equal to the SWIB value. No extra bandwidth is assigned for an ATM/VBR delay sensitive call, and therefore the extra bandwidth allocation parameter, $R_x$, for the call is set to zero (also in step 1405). An example of a process to determine SWIB is described in the context of FIG. 17, and the concept of SWIB is explained below in the description of FIG. 18.

Figure 15:
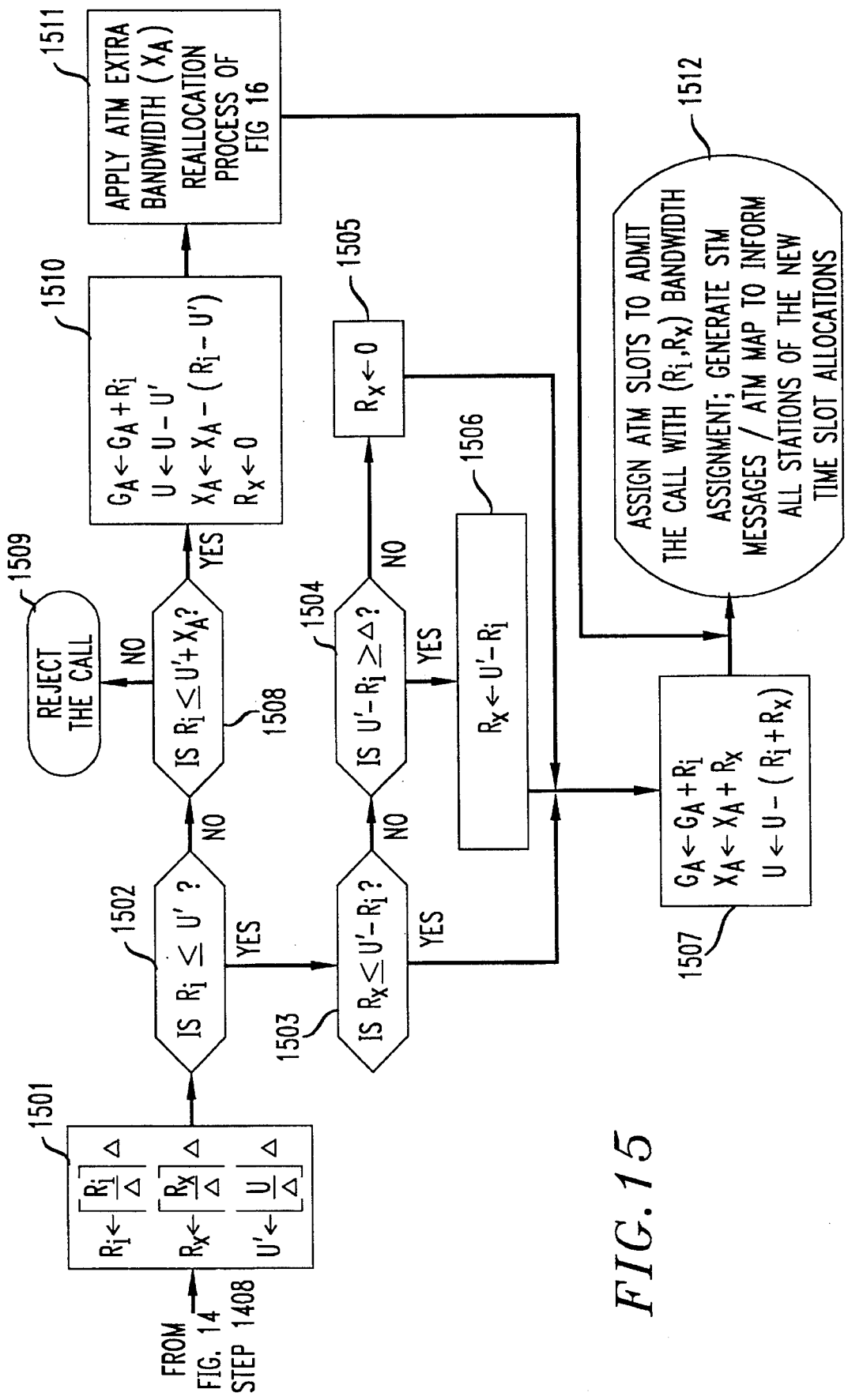
FIG. 15 is a process diagram illustrating how bandwidth allocation is performed for an ATM/CBR or ATM/VBR call.
Figure 21:
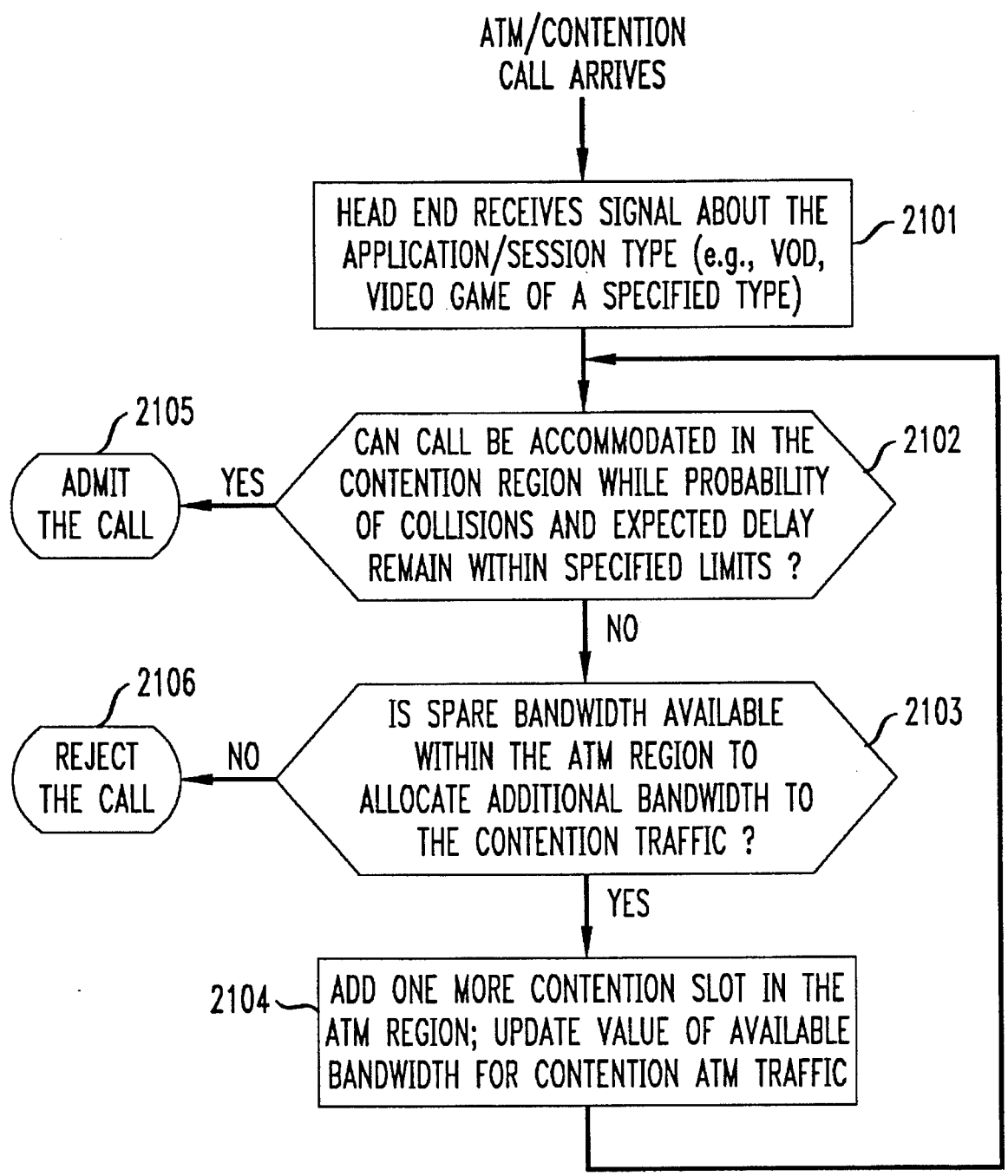
FIG. 21 is a process diagram illustrating how an ATM/contention call is processed at the head end.

If the type of call is identified at step 1403 as ATM/VBR delay tolerant, then the process proceeds to step 1406. At step 1406, the bandwidth controller 435 obtains delay tolerance limits for the call in consideration, and determines the guaranteed bandwidth $R_i$ required to support the call. The guaranteed bandwidth $R_i$ is determined so that it is just adequate to meet the upper bound of the delay requirement specified by the ATM/VBR delay tolerant call. Also at step 1406, the bandwidth controller 435 determines extra bandwidth $R_x$ that can be assigned to the connection to meet the specified lower bound of the delay requirement. The process proceeds from steps 1404, 1405, or 1406 to step 1408, where the process of FIG. 15 is used to determine call admission and bandwidth allocation based on bandwidth request parameters ($R_i$, $R_x$) as determined at steps 1404, 1405, or 1406. If the type of call is identified at step 1403 as ATM/contention, then the process proceeds to step 1407, where the process of FIG. 21 is used to determine call admission.

After determination of the bandwidth allocation parameters ($R_i$, $R_x$) in FIG. 14, the process in FIG. 15 determines whether or not the call can be admitted. In step 1501, the parameters $R_i$ and $R_x$ and the unassigned bandwidth U are quantized into nearest multiples of $\Delta$, which represents a quanta of bandwidth corresponding to allocation of one ATM time slot per bandwidth allocation cycle. The bandwidth allocation cycle may be one frame long (as in FIG. 12), or it may be "n" frames long (as discussed later in FIG. 19). The quantized value of U is represented by U' in step 1501. At step 1502, it is determined whether U' is adequate to assign $R_i$ to the call. If the result in step 1502 is positive, then the process proceeds to step 1503. At step 1503, it is determined whether the remaining unassigned bandwidth (U'-$R_i$) is adequate to assign extra bandwidth $R_x$ to the call. If the result in step 1503 is positive, then a decision is made to allocate $R_x$ to the call, and the process proceeds to step 1507. If the result in step 1503 is negative, then in step 1504 it is determined whether (U'-$R_i$) is larger than or equal to $\Delta$. If the result of step 1504 is negative, then $R_x$ is set to zero in step 1505, and the decision is made not to allocate any extra bandwidth to the call. However, if the result in step 1504 is positive, then the decision in step 1506 is to allocate extra bandwidth equal to (U'-$R_i$), because that is the most unassigned bandwidth that is currently available.

From steps 1505 or 1506, the process proceeds to step 1507. At step 1507 the values of $G_A$, $X_A$ and U are updated in accordance with the admission of the ATM call, and the process proceeds to step 1512. The call is admitted and STM messages and ATM MAP are generated in step 1512, to inform all stations of the new time slot allocations.

If the result in step 1502 is negative, it means that the unassigned bandwidth by itself is inadequate to allocate the guaranteed bandwidth $R_i$. A determination is made in step 1508 as to whether or not the unassigned bandwidth U' and the extra bandwidth $X_A$ together are adequate to assign bandwidth $R_i$ to the call. If the result in step 1508 is negative, then the call is rejected in step 1509. If the result in step 1508 is positive, then a decision is made to admit the call. In this case, a portion of the bandwidth needed to admit the call comes from the extra ATM bandwidth region $X_A$. Then, in step 1510, the parameters $G_A$, U and $X_A$ are updated. Now, due to the change in $X_A$, the ATM extra bandwidth reallocation process of FIG. 16 is used in step 1511. Then the process proceeds to step 1512, which was previously described.

In the process of call admission and bandwidth allocation in the ATM region, whenever a change occurs in the value of $X_A$, the extra bandwidth allocations for existing ATM/VBR connections have to be revised. In the process shown in FIG. 16, in step (A), a suitable criterion is used to determine reallocation of $X_A$ over existing ATM/VBR calls. An example of this criterion is to proportionately reallocate the extra bandwidth in accordance with the extra bandwidth requests originally made by each of the existing ATM/VBR calls. In step (B) of the process in FIG. 16, new values of $R_x$ are computed for each of the affected connections by the decision made in step (A). Then in step (C), new ATM MAP information is generated to notify all stations of the ATM time slot reallocations.

Figure 17:
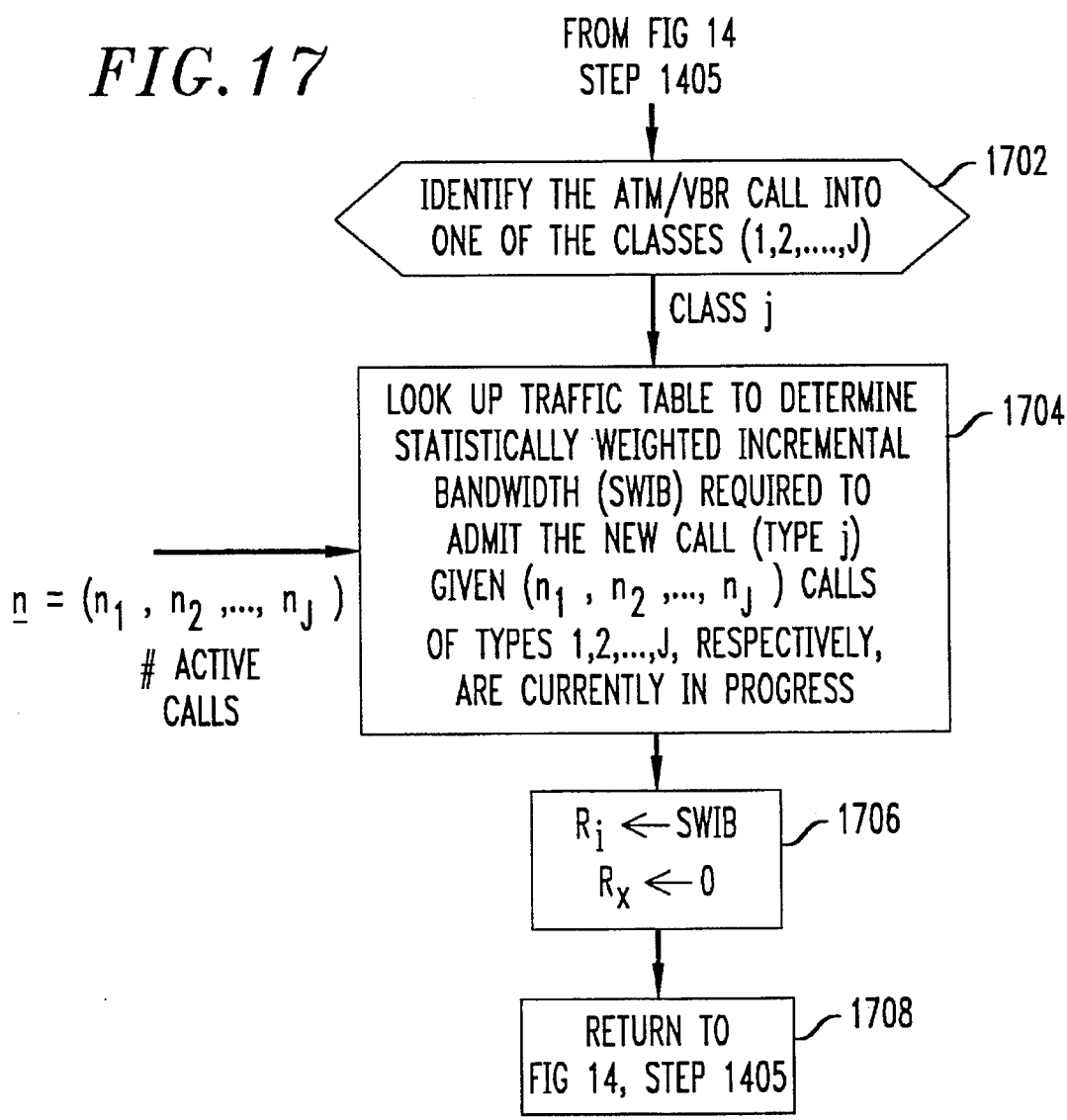
FIG. 17 is a process diagram illustrating how bandwidth for a delay sensitive ATM/VBR call is determined.

The process of FIG. 17 is applied in step 1405 of the process in FIG. 14. It shows how the Statistically Weighted Incremental Bandwidth (SWIB) is determined. First, in step 1702, the ATM/VBR call is classified into one of classes 1, 2, . . ., J. Assume the outcome of step 1702 is that the call is of class j for some value of j. Before we proceed further in the flowchart of FIG. 17, we turn to FIG. 18 for a moment to describe the concept of SWIB.

Figure 18:
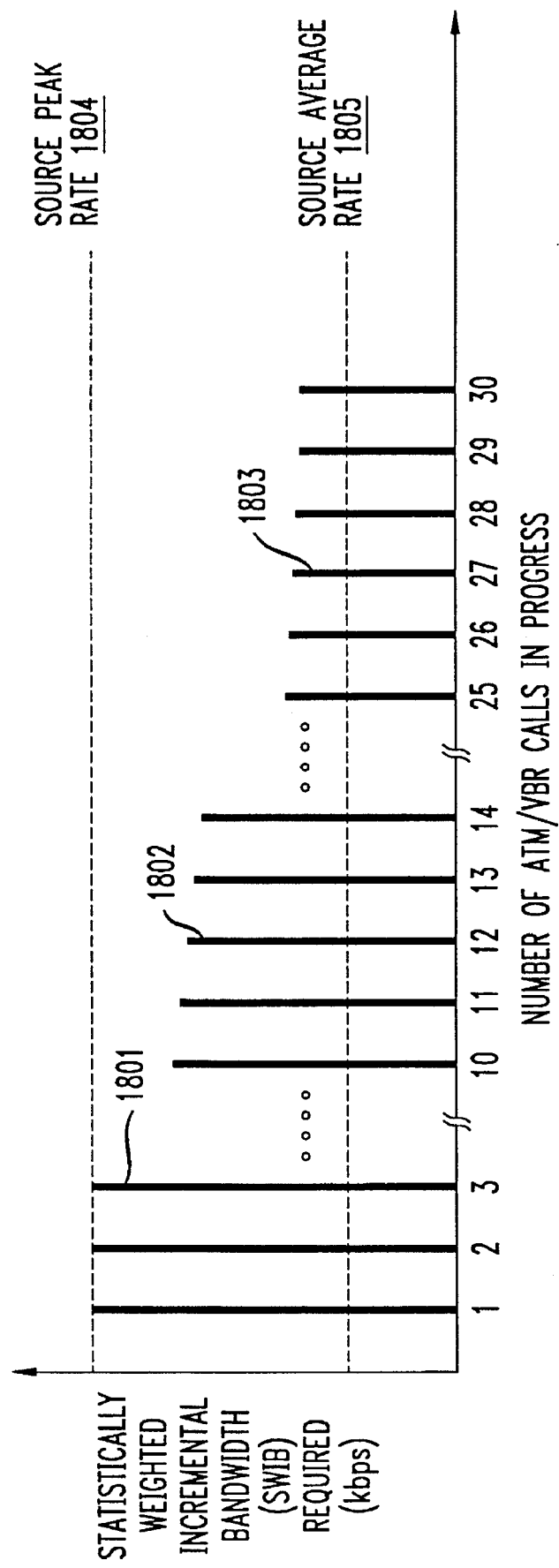
FIG. 18 is a process diagram illustrating the concept of Statistically Weighted Incremental Bandwidth (SWIB) for delay sensitive ATM/VBR calls.

FIG. 18 shows SWIB values required to admit a new call of a particular class, given that there are already "n" such calls admitted in the system. The SWIB values are shown by the vertical bars, and the values of "n" are shown on the horizontal axis. When "n" is small, such as 1, 2 or 3, the value of SWIB 1801 is equal to the source peak rate 1804. When the number of calls multiplexed together is small, statistical averaging across multiple ATM/VBR calls does not yield any Statistical Multiplexing Gain (SMG), and therefore the call can only be admitted with a SWIB value 1801 equal to the peak rate bandwidth 1804. When the number of calls in progress has an intermediate value, such as 12, some SMG is possible, and therefore the call may be admitted with a bandwidth allocation 1802 that is smaller than the peak rate 1804, but larger than the average rate 1805. When the number of calls in progress has a high value, such as 27, significantly high SMG is possible, and therefore the call may be admitted with a bandwidth allocation 1803 that is much smaller than the peak rate 1804 and fairly close to the average rate 1805. The bandwidth determined from FIG. 18 is called SWIB, because it is statistically weighted by the number of calls in progress, and represents the incremental bandwidth that is required to admit a new call while meeting performance requirements specified for the class of calls in consideration. The performance requirements may be specified in terms of ATM cell delay and loss ratio. Higher cell delay and loss ratios may occur when the congestion condition of the system is severe. It may also be noted that the SWIB value corresponding to "n" calls in FIG. 18 also represents the decrease in bandwidth allocation for the class of calls as a whole, when one call terminates out of (n+1) calls that are currently admitted.

Now returning to FIG. 17, step 1704, bandwidth controller 435 reads from ATM buffers 431 (see FIG. 4), a set of values, $n=(n_1, n_2, \ldots, n_J)$, representing the number of ATM/VBR calls of type 1, 2, . . ., J, respectively, that are currently admitted. Also in step 1704, bandwidth controller 435 looks up a traffic table stored in ATM buffers 431, to determine SWIB required to admit the new ATM/VBR call of type j. The traffic table referred to here for SWIB determination is a generalization of the concept of SWIB illustrated in FIG. 18, but for a multiplicity (i.e., one or more) classes of ATM/VBR calls that are statistically multiplexed together. Next, in step 1706, $R_i$ is set equal to the SWIB value determined in step 1704 and $R_x$ is set to zero. Then in step 1708, the process returns to FIG. 14, step 1405.

Figure 19:
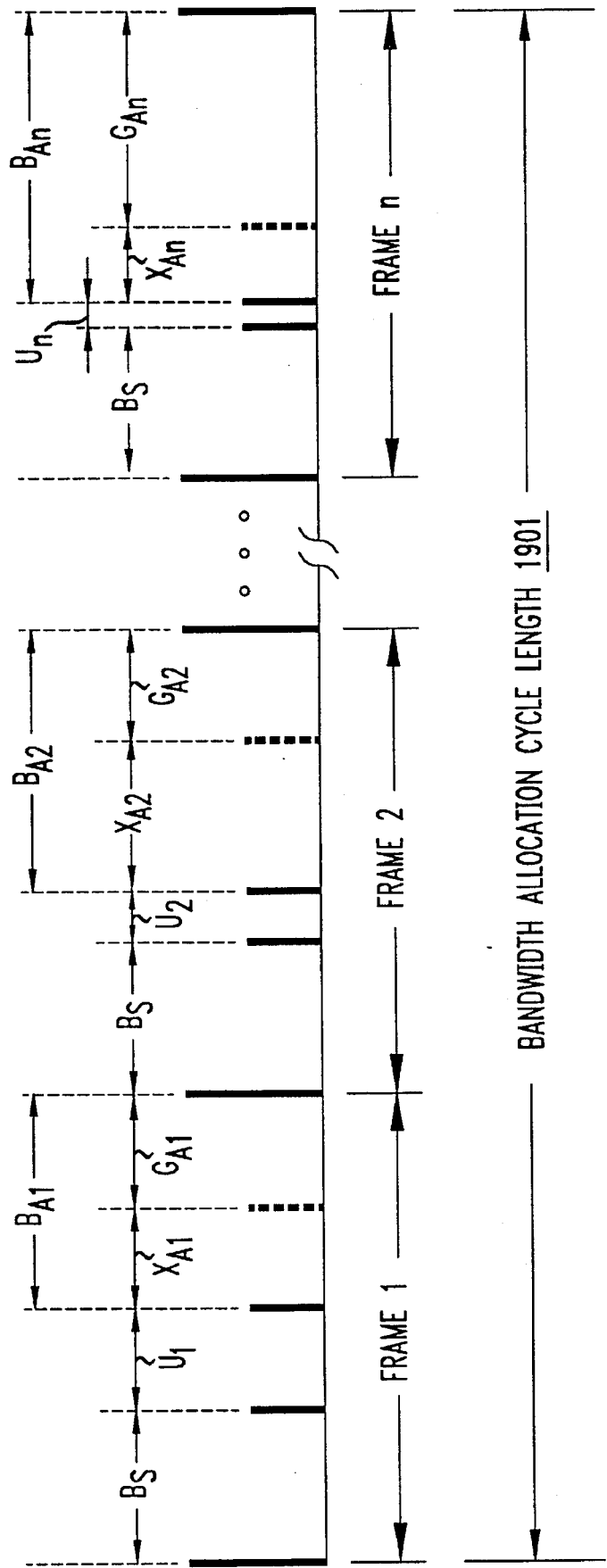
FIG. 19 is a process diagram illustrating the designations for various fields or regions within a series of time frames over which bandwidth allocation decisions are made.

In FIG. 19, there is shown "n" consecutive frames which represent a bandwidth allocation cycle 1901. FIG. 19 is similar to FIG. 12, which represented the case when n=1. When the bandwidth allocation cycle 1901 spans over multiple frames, the lengths of the ATM regions ($B_{A1}, B_{A2}, \ldots, B_{An}$) and the unassigned regions ($U_1, U_2, \ldots, U_n$) can vary from one frame to another within the cycle of "n" frames. The guaranteed ATM regions ($G_{A1}, G_{A2}, \ldots, G_{An}$) and the extra ATM regions ($X_{A1}, X_{A2}, \ldots, X_{An}$) also can vary from one frame to another within the cycle of "n" frames. However, the length of the STM region, $B_S$ does not vary from frame to frame, because the STM time slots are allocated synchronously with a periodicity of one frame. The reason for the periodicity of one frame for STM time slots is due to the tighter delay constraint for STM calls. The reason why the ATM traffic allows for a bandwidth allocation cycle of multiple frames is due to delay tolerance allowed for certain types of ATM traffic. An ATM/VBR file transfer may be completed, for example, with the allocation of one ATM time slot every fifth frame, and its delay requirement can still be met. If a second ATM call is allocated an ATM time slot once in every second frame, then the combined bandwidth allocation cycle length for the previously mentioned file transfer and the second ATM call would be ten (i.e., n=10 in FIG. 19). Now a quanta of ATM bandwidth, $\Delta$, that was earlier referred to in the context of the bandwidth allocation process of FIG. 15, represents allocation of one ATM time slot in "n" frames. With this definition of $\Delta$, the process of FIG. 15 can be suitably modified to reflect a bandwidth allocation cycle of "n" frames (n>1).

Figure 20:
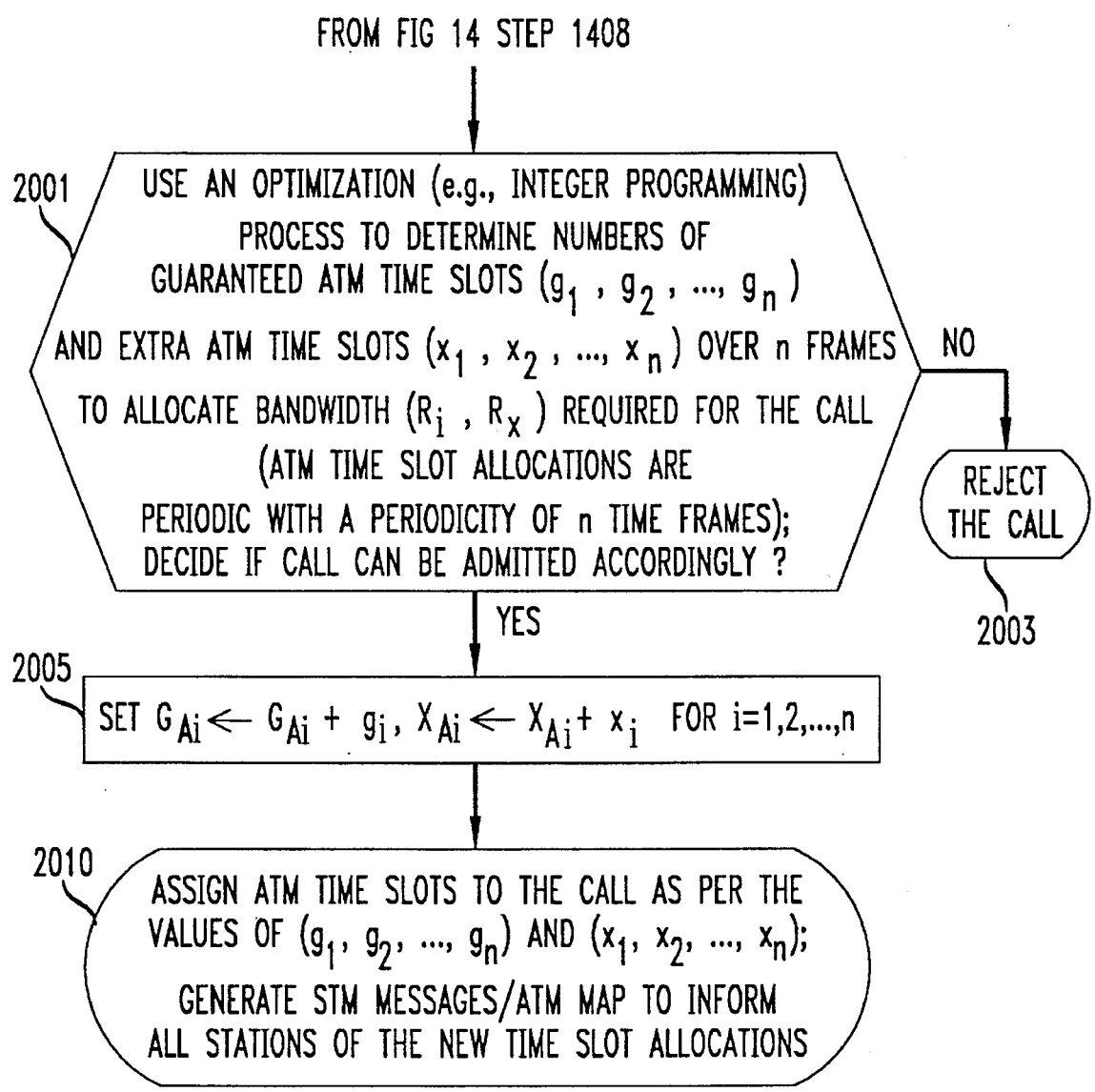
FIG. 20 is a process diagram illustrating how bandwidth allocation is performed for an ATM/CBR or ATM/VBR call over a bandwidth allocation cycle of the multiple frame periodicity shown in FIG. 19.

FIG. 20 shows a modified bandwidth allocation process for ATM calls without repeating all the details shown in FIG. 15. Those details can be worked out easily by a person skilled in the art, based on FIG. 15, to elaborate the process of FIG. 20.

In FIG. 20, there is shown a process flowchart for call admission and allocation of guaranteed ATM time slots and extra ATM time slots, when the bandwidth allocation cycle spans over "n" frames, as shown in FIG. 19 and described above. If bandwidth allocation is done over a cycle of "n" frames (n>1), then the process of FIG. 14 at step 1408 would proceed to FIG. 20 rather than FIG. 15. In step 2001 of FIG. 20, the bandwidth controller uses an optimization (e.g., integer programming) process to determine the numbers of guaranteed ATM time slots ($g_1, g_2, \ldots, g_n$) and the numbers of extra ATM time slots ($x_1, x_2, \ldots, x_n$) over "n" frames (periodically) to allocate bandwidth ($R_i, R_x$) required for the call. If the optimization process in step 2001 determines that there is no set of values for ($g_1, g_2, \ldots, g_n$) that can be assigned to meet the requirement of guaranteed bandwidth allocation $R_i$, then the call is rejected in step 2003. Otherwise, a decision is made to admit the call with the values of ($g_1, g_2, \ldots, g_n$) and ($x_1, x_2, \ldots, x_n$) as determined by the optimization process of step 2001. The process proceeds to step 2005 and updates the values of $G_{A_i}, X_{A_i}, i=1,2, \ldots n$. Then, in step 2010, the call is admitted, and STM messages and ATM MAP are generated to inform all stations of the new time slot allocations.

Figure 22:
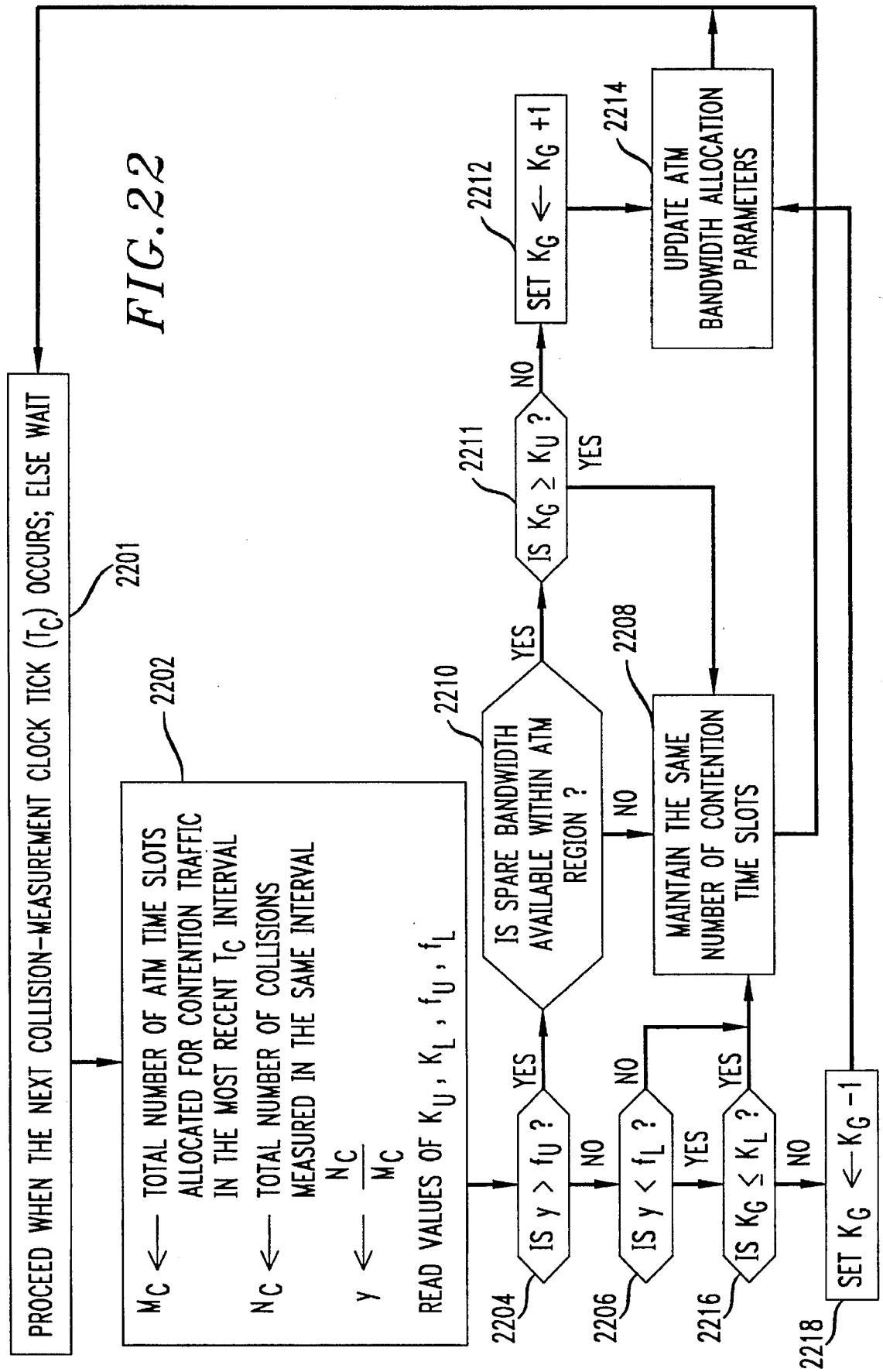
FIG. 22 is process diagram illustrating how decisions are made regarding the bandwidth currently assigned to ATM/contention traffic.

Before describing FIGS. 21 and 22, it would be useful to make a few general observations about bandwidth allocation for ATM/contention traffic. It should be noted that every ATM time slot is normally treated as open for contention, unless assigned to an existing ATM/CBR or ATM/VBR call. Depending on the ongoing ATM/contention traffic, a certain number of ATM time slots, $K_G$, are guaranteed for the ATM/contention traffic. All the remaining unassigned ATM time slots remain "open" for contention, and such time slots may be thought of as extra ATM bandwidth available for contention traffic. The "open" contention slots can be assigned upon request to a new ATM/CBR or ATM/VBR call. An open time slot can also be assigned as a guaranteed time slot for the ATM/contention traffic by the processes in FIGS. 21 and 22, as described below. When the number of ATM/contention slots is incremented or decremented by the processes in FIGS. 21 or 22, it is the value of $K_G$ that gets incremented or decremented.

FIG. 21 shows the process that is followed in bandwidth controller 435 when a request is received to set up an ATM/contention call. Examples of ATM/contention calls include VOD and video games (upstream messages). In step 2101, head end 109 receives signals specifying the application/session type. In step 2102, head end 109 first determines the increase in the average load due to the call. Then, based on the traffic table for contention-oriented calls maintained in ATM buffers 431, head end 109 determines whether or not the call can be admitted while keeping the probability of collisions and expected delay within specified limits. If the result in step 2102 is positive, then the call is admitted in step 2105. However, if the decision in step 2102 is negative, then, in step 2103, bandwidth controller 435 determines whether or not spare bandwidth is available within the ATM region to allocate additional bandwidth to the contention traffic. If the result of step 2103 is negative, then the call is rejected in step 2106; otherwise, the process proceeds to step 2104. At step 2104, one more contention time slot is added to the ATM region, and the value of $K_G$, representing the available bandwidth for contention ATM traffic, is updated, i.e., incremented by "1". Then the process returns to step 2102. The cycling through steps 2102, 2103, and 2104 stops either when the call is admitted in step 2105, with the addition of extra bandwidth, or the call is rejected in step 2106, due to lack of spare bandwidth to add to the ATM region.

FIG. 22 shows the flow diagram of the process implemented in bandwidth controller 435 to increment or decrement the number of guaranteed ATM/contention slots, $K_G$, depending on a measurement of the frequency of collisions in the ATM/contention slots. The collision measurements are taken over $T_C$ time intervals, and stored in ATM buffers 431. $M_C$ and $N_C$ denote the total number of ATM time slots allocated for contention traffic and the total number of collisions measured, respectively, in interval $T_C$. $K_U$ and $K_L$ represent the upper and lower bounds on $K_G$. $f_U$ and $f_L$ represent pre-specified upper and lower collision thresholds. In step 2201, the process waits and proceeds to the next step only when the next collision-measurement clock tick occurs. In step 2202, the values of $M_C$, $N_C$, $K_U$, $K_L$, $f_U$, and $f_L$ are read in from ATM buffers 431, and the collision frequency, y, is computed. Then the process proceeds to step 2204, where it is determined whether the measured collision frequency, y, exceeded $f_U$. If the result in step 2204 is negative, then the process proceeds to step 2206, where it is determined whether y is below $f_L$. If the result of step 2206 is also negative, then the number of contention slots remains unchanged, as shown in step 2208, and the process returns to step 2201. If the result in step 2204 is positive, then in step 2210 it is checked whether any spare bandwidth is available to allocate additional bandwidth to the contention traffic. If the result of step 2210 is negative, then the process proceeds to step 2208. If, on the other hand, the result of step 2210 is positive, then, in step 2211, it is checked whether $K_G$ is equal to or greater than $K_U$. If the result in step 2211 is negative, then $K_G$ is incremented by one, and thus one more contention slot is guaranteed to ATM/contention traffic. The process proceeds to step 2214, where the relevant ATM bandwidth allocation parameters are updated. From step 2214, the process returns to step 2201. If the result in step 2211 is positive, then the process proceeds to step 2208 and maintains the same number of contention time slots in step 2208, and then returns to step 2201. If the result in step 2206 is positive, then in step 2216, the number of slots, $K_G$, guaranteed to ATM/contention traffic is compared to check if it is equal to or lower than a pre-specified lower bound $K_L$. If the result in step 2216 is positive, then the process proceeds to step 2208 and maintains the same number of contention time slots, and then returns to step 2201. If the result in step 2216 is negative, then $K_G$ is decremented by one in step 2218. From step 2218, the process proceeds to step 2214, where the ATM bandwidth allocation parameters are updated, and then the process returns to step 2201.

Figure 23:
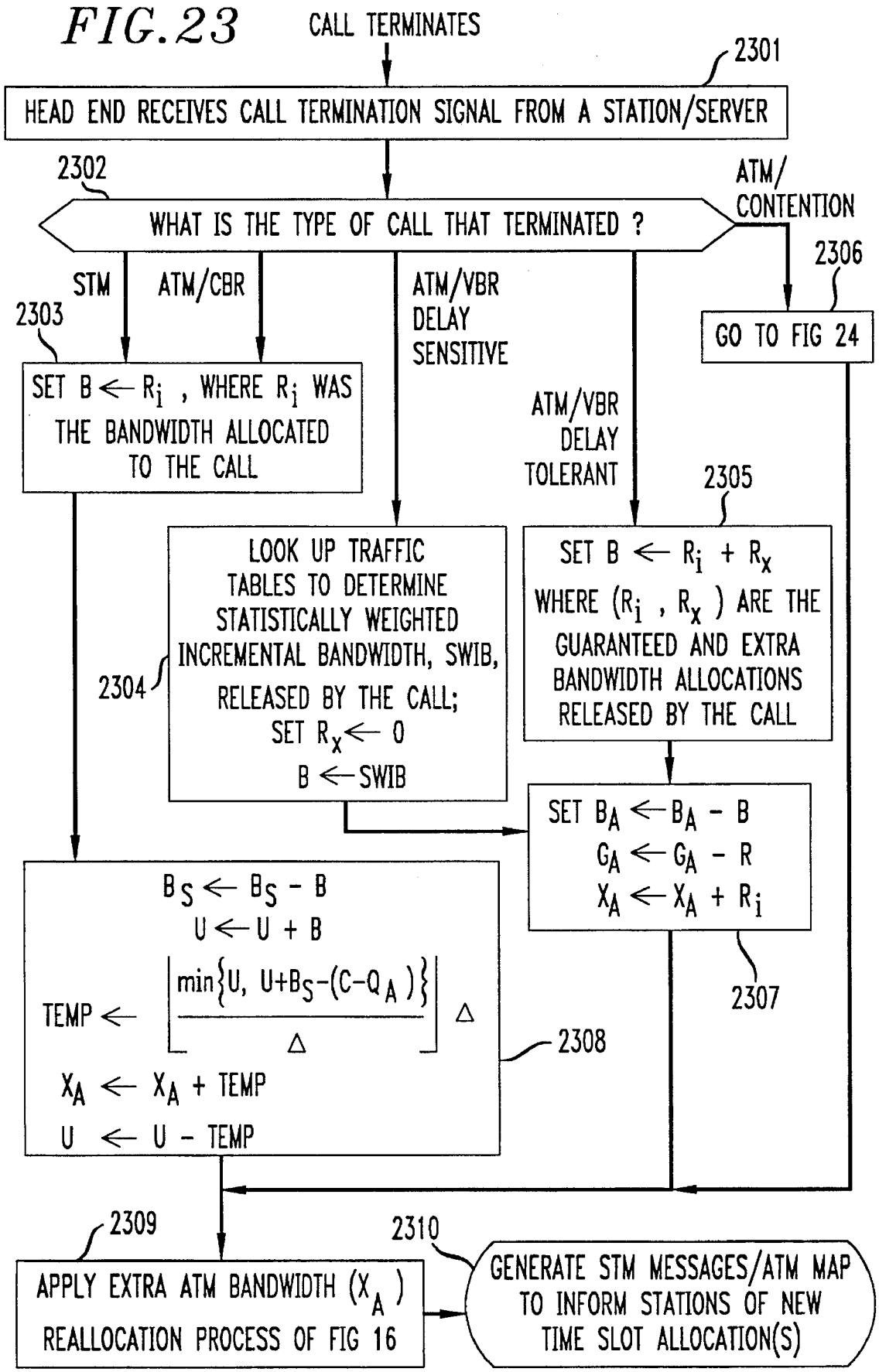
FIG. 23 is a diagram illustrating the process followed in the head end when a call terminates; this diagram should be read in conjunction with FIG. 24.
Figure 24:
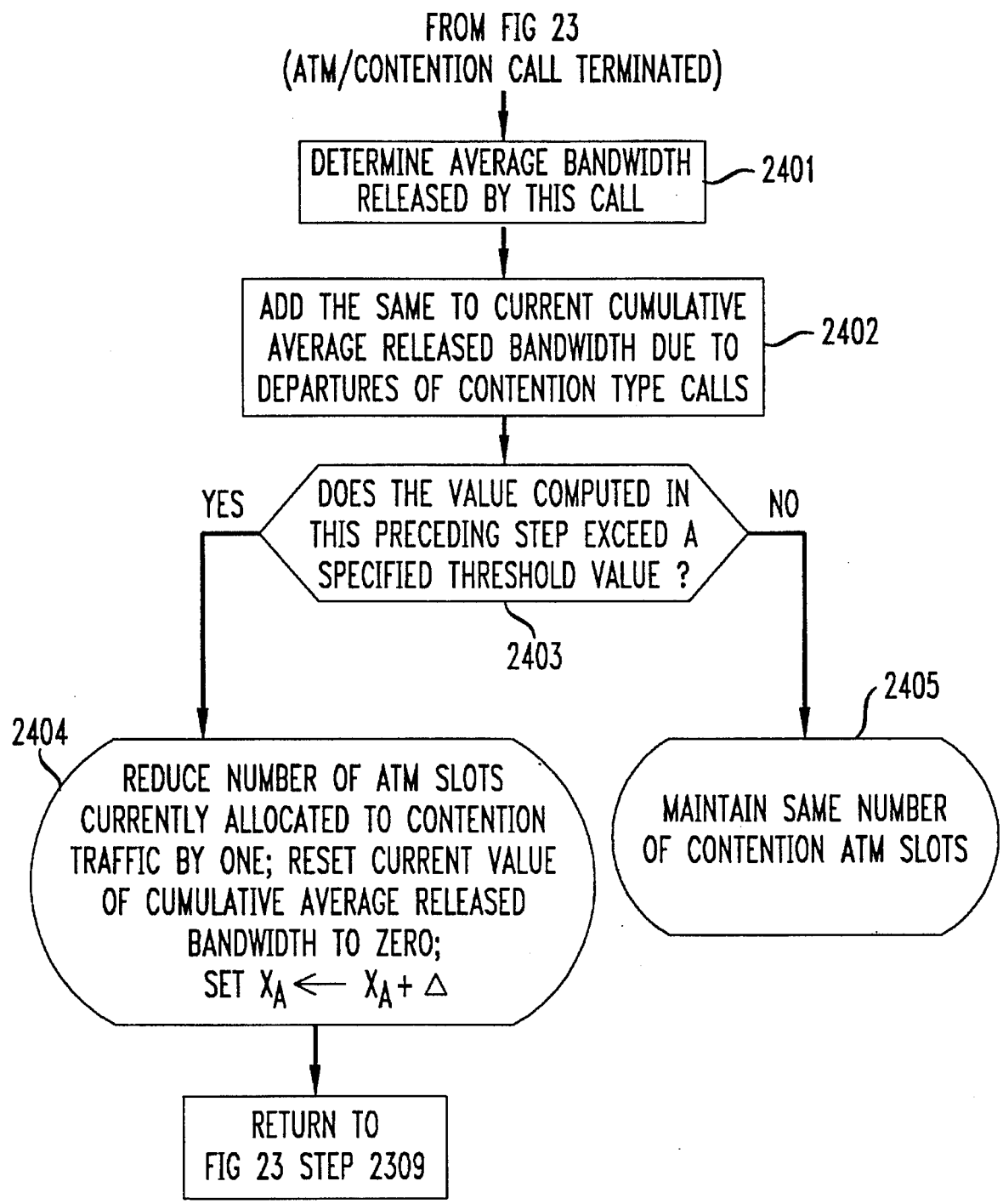
FIG. 24 is a diagram illustrating the process followed in the head end when an ATM/contention call is terminated.

In FIG. 23, there is shown the process flowchart for actions taken in the bandwidth controller 435 when a call termination occurs. The process in FIG. 23 accomplishes the task of releasing bandwidth due to a call departure and updating the values of all the affected parameters associated with ATM and STM bandwidth regions. In step 2301, the head end 109 receives a call termination signal from a station 107 or a service platform 490. In step 2302, bandwidth controller 435 identifies the type of call that terminated. If the type of call was either STM or ATM/CBR, then in step 2303, the variable B is set to $R_i$, where $R_i$ was the bandwidth allocated to the call, and the process proceeds to step 2308. In step 2308, the STM bandwidth is decremented by the amount of the released bandwidth B, the unassigned bandwidth U is incremented by the same amount, then the unassigned bandwidth is quantized and converted into extra ATM time slot allocations $X_A$. Note that the calculation of the parameter TEMP in step 2308 includes consideration of the constraint ($B_A < Q_A$) as specified in FIG. 12. From step 2308, the process proceeds to step 2309. If the call was identified in step 2302 as ATM/VBR delay sensitive, then the process proceeds to step 2304. In step 2304, the bandwidth controller looks up traffic tables to determine the statistically weighted incremental bandwidth (SWIB) released by the call. The method for determining SWIB at call arrival or departure was described above in connection with FIG. 18. Also in step 2304, the value of B is set to the SWIB value, and $R_x$ is set to zero, and the process proceeds to step 2307. If the call was identified in step 2302 as ATM/VBR delay tolerant, then in step 2305 the value of B is set to ($R_i+R_x$), where $R_i$ and $R_x$ are the guaranteed and extra bandwidth allocations released by the call, and the process proceeds to step 2307. In step 2307, the values of the bandwidth parameters associated with the ATM region are updated, the released bandwidth is added to the extra ATM region $X_A$, and the process proceeds to step 2309. If the call was identified in step 2302 as ATM/contention, then the process of FIG. 24 is applied in step 2306, and the process proceeds to step 2309. In step 2309, the process of FIG. 16 is applied for reallocation of the extra ATM bandwidth $X_A$, and then, in step 2310, STM messages and ATM MAP are generated to inform all stations of new time slot allocations. It may be noted that at step 2306, $X_A$ sometimes may not change (especially in the process of FIG. 24), in which case steps 2309 and 2310 would not be necessary.

FIG. 24 shows the process followed in bandwidth controller 435 when ATM/contention call termination occurs. In step 2401, the average bandwidth released by the call is determined, and the same is added in step 2402 to the current cumulative average released bandwidth due to departures of contention-type calls. Then, in step 2403, the value of the current cumulative average (computed in step 2402) is checked to see if it exceeded a specified threshold value. Since the average bandwidth released by individual ATM/contention calls is typically very small, a decision to release bandwidth is made typically after several such calls have departed in succession. If the result in step 2403 is negative, then the same number of ATM/contention slots are maintained in the ATM region, as indicated in step 2405. If the result of step 2403 is positive, then in step 2404, the number of ATM time slots, $K_G$, currently allocated to contention traffic is reduced by one, and the current value of cumulative average released bandwidth is set to zero. Also, in step 2304, the value of extra ATM bandwidth $X_A$ is incremented by A, which represents the incremental bandwidth associated with allocation of one ATM time slot per bandwidth allocation cycle. Now the process returns to FIG. 23, step 2309.

Figure 25:
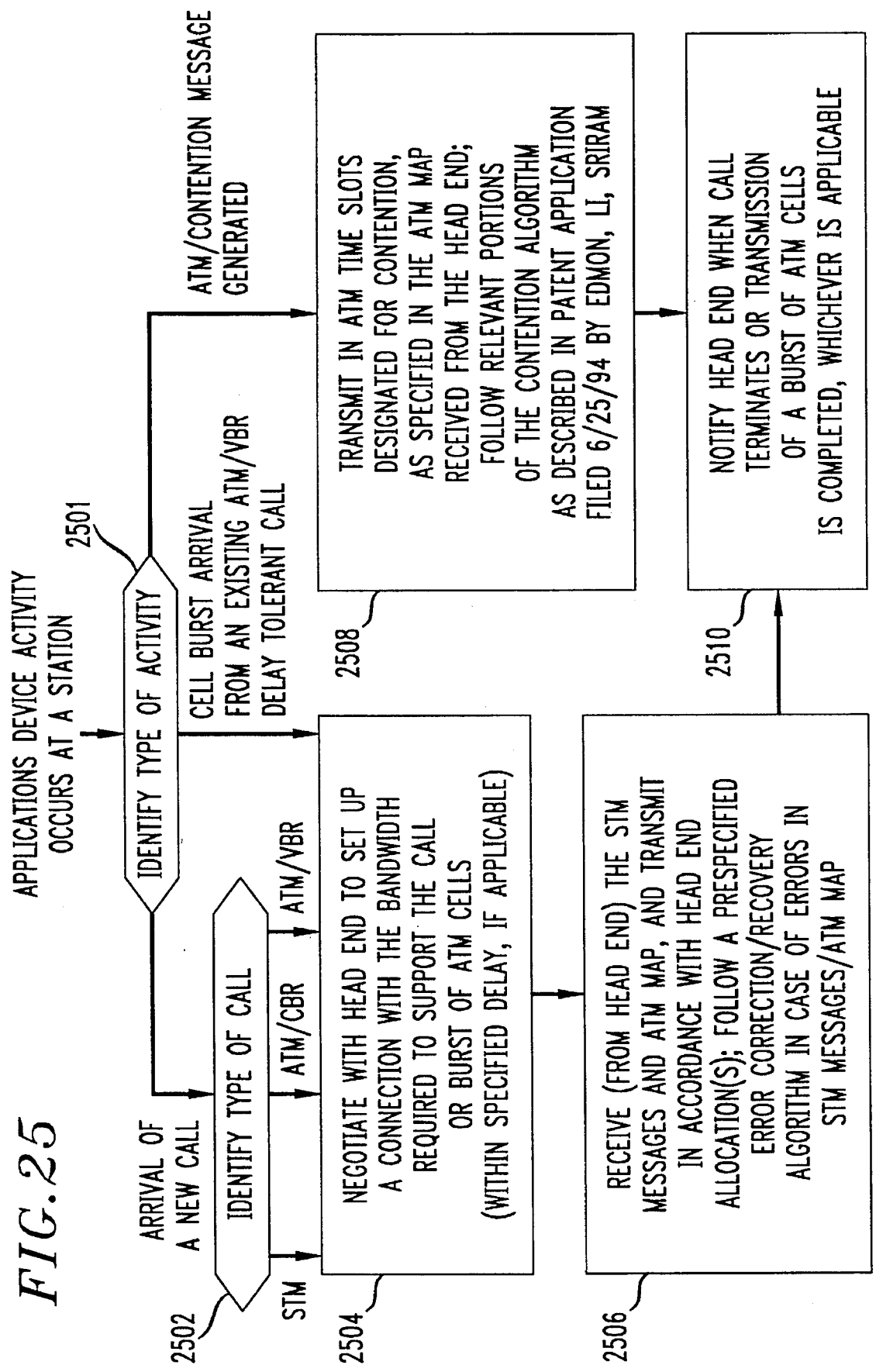
FIG. 25 is a diagram illustrating the process followed at a station when a terminal or device becomes active.

In FIG. 25, there is shown the flow diagram of the process implemented in station 107 in its bandwidth controller 335, and followed whenever an application device activity occurs. The type of activity is identified in step 2501. If the activity is identified as an arrival of a new call, then the process proceeds to step 2502, where the type of call is identified. From step 2502, the process proceeds to step 2504. If the type of activity identified in step 2501 is an arrival of a burst of ATM cells from an existing ATM/VBR delay tolerant call, then also the process proceeds to step 2504. In step 2504, the bandwidth controller 335 negotiates with head end 109 to set up a connection with the bandwidth required to support the call or the burst of ATM cells. In step 2504, the minimum and maximum delay tolerance for a burst of ATM cells may be specified, if applicable, in the negotiation with head end 109. The process proceeds from step 2504 to step 2506. In step 2506, bandwidth controller 335 in station 107 receives from head end 109 the STM messages and ATM MAP, and transmits in accordance with head end allocations. In step 2506, station 107 also follows a pre-specified error correction/recovery technique in case of errors in STM messages or in the ATM MAP. The use of a particular error correction/recovery technique is not required, and any of several currently available techniques may be used. The process proceeds from step 2506 to step 2510. When a call terminates or transmission of a burst of ATM cells is completed, station 107 notifies head end 109 of such an event. In step 2501, if the activity is identified as the generation of an ATM/contention message, then bandwidth controller 335 in station 107 transmits the ATM/contention message using the contention technique as described in detail in the above-cited Edmon, Li and Sriram patent application. The ATM/contention technique used in the present invention differs in some ways from the technique in the above-cited Edmon, Li and Sriram patent application. In particular, the idea of "super slots" is not used. Also, as described in earlier parts of this disclosure, head end 109 exercises control over allocation or deallocation of ATM/contention time slots in several ways that significantly differ from that in the above-cited Edmon, Li and Sriram patent application. For example, see processes described in FIGS. 21 and 22.

Having thus described the present invention in detail, it is now to be noted that the present invention provides significant capacity advantages over known MAC protocols. For STM traffic, it provides at least the same capacity as the conventional TDMA protocol. However, for ATM traffic classes, that will be supported in broadband tree and branch networks (based on fiber/coax or wireless medium), the MAC protocol of the present invention provides significantly higher capacities. The present invention provides superior capacity due, at least in part, to the way that several significant technical issues are addressed. Specifically, with respect to propagation delay, the present invention is insensitive to propagation delay for distances up to 150 km. A frame size of 2 ms is preferred for this reason, and is adequate to cope with round trip acknowledgment delay for the 150 km distance. The operation of the invention is generally independent of the frame length. If the distances are smaller in a specific network, a smaller frame length can be selected.

Further, it is not desirable for stations to be idle while waiting for a fairly long time relative to the packet transmission time, due to round trip propagation delay, to receive the head end acknowledgments. This problem is avoided by interleaving traffic associated with different stations into multiple time slots within a frame, and assuring that for a particular station, the successive time slots used by that station are spaced apart (in time) from each other by at least the amount of the expected round trip propagation delay. Accordingly, by the technique of this invention, the frame is composed of many interleaved ATM time slots; the actual number of time slots depends on the bit rate. Since a frame consists of interleaved time slots, one of the stations can transmit in one time slot of the frame, and wait for a predetermined time (e.g., 2 ms) to receive an acknowledgment. In the meantime, the channel does not experience any dead time, because other stations can transmit in the other time slots of the frame. The status acknowledgments are also interleaved over alternate frames, since messages such as BUSY/CONTINUATION, BUSY/FINAL, COLLISION and IDLE pertaining to ATM time slots in one upstream frame are sent in the MAP field in the next downstream frame.

The present invention also provides head end or central controller arbitration, which is particularly advantageous in managing ATM/CBR and ATM/VBR traffic. The head end can receive, from a station originating such traffic, any information concerning bandwidth requirement, burst length and delay tolerance. It can then assign slots at a rate that meets the bandwidth and delay requirements. This is the "reservation" component of the MAC protocol of this invention. By this mechanism, a station with delay sensitive ATM/CBR traffic may be assigned one or more time slots in every frame, to match the rate of generation of ATM cells at the station with the rate at which time slots are assigned to that station. On the other hand, a station with delay tolerant ATM/VBR traffic might not be assigned one slot in every frame; instead, it may, for example, get permission (from the controller) to transmit in one slot every fifth frame, if that satisfies the delay requirement as specified by the station.

Although the previous description mentioned several approaches for determining when "repacking" (as defined previously) should occur, there are several specific details and arrangements which may be considered and used for this function, as set forth below. Accordingly, in a specific implementation of this invention, the cost benefit trade-offs for the subscriber population must be taken into consideration in determining which repacking alternative is preferred.

A first approach is called "Quick Repacking and Creation of Additional ATM Slots". With this approach, existing ATM traffic makes use of the bandwidth released by an STM call. This can be arranged as follows. After the departure of an STM call, the remaining STM connections can be repacked within the next frame or two. The released (i.e., unassigned) bandwidth can be then used to create as many ATM slots as possible. The newly created ATM slots are added to the existing ATM slots, and thereby the ATM region is extended into the unassigned region (see FIG. 12). The STM traffic can reclaim the some of the released bandwidth from the ATM potion of the frame on a demand basis, i.e., when new STM calls requires it.

A second approach is called "Quick Repacking and Adding Bandwidth to a Common Spare Pool". This approach is based upon the fact that, when an STM call departs and releases some bandwidth, it is not known apriori as to whether the next connection request will be STM or ATM. Therefore, the released bandwidth is added to a spare pool. This can be arranged by (1) repacking the active STM calls, and (2) adding the bandwidth thus released to the unassigned region of the frame between the STM and ATM regions. This unassigned or idle region of the frame constitutes the spare pool of bandwidth, and new STM/ATM time slots may be created on a demand basis by decisions made in the controller. When the controller decides to admit a new STM call, it does so by adding an STM slot and extending the STM portion of the frame into the unassigned region. When the controller decides to create one or more new ATM slots, those slots are created by extending the ATM portion of the frame into the unassigned region. In this way, the spare bandwidth always resides between the STM and ATM regions in a frame.

A third approach is called "STM Need Driven Repacking". With this approach, "holes" in the STM portion of the frame are left untouched, i.e. no repacking is done, until it becomes necessary to accommodate a new STM or ATM call. This situation arises when the "holes" are created in a non-contiguous way, and when there is enough aggregate bandwidth to admit a new call, but there is no single time slot or span of several time slots (in the STM portion) that is large enough. When such a situation is identified, the controller does a repacking at that time, so that the new call can be admitted.

A fourth approach is similar to the third approach, except that the repacking is performed at periodic or fixed intervals, rather than being triggered by the arrival of a new STM or ATM call.

No matter which repacking alternative is used, following a repacking action at the controller, all stations are notified of the new STM and/or ATM time slot allocations, by sending messages in the STM signaling and MAP portions of the next downstream frame.

Persons skilled in the art will recognize that various modifications may be made to the present invention. Accordingly, the invention should be limited only by the following claims. For example, another modification can achieve higher bandwidth efficiency by considering multiple upstream and downstream channels collectively as a "group", for bandwidth allocation and call admission decisions. As discussed earlier in the context of FIG. 2, the upstream bandwidth is usually organized in the form of multiple channels 202-1 through 202-n. Similarly, the downstream bandwidth (see FIG. 2) is also usually organized in the form of multiple channels 203-1 through 203-m. The time within each of these upstream and downstream channels is divided into a series of time frames, such as those shown in FIGS. 7,8, and 9. In FIGS. 12 through 25, the processes for bandwidth allocation for STM and ATM calls were described, considering a series of frames within one upstream channel, and a corresponding series of frames in one associated downstream channel. However, it should be noted that the bandwidth allocation and dynamic adjustments of STM regions ($B_S$), ATM regions ($B_A$, $G_A$, $X_A$), and the boundary regions (U) (see FIG. 12) can be performed on more than one channel, or even "globally" on all channels, by considering multiple upstream channels 202-1 through 202-n and multiple downstream channels 203-1 through 203-m as a "group". In such an arrangement, the frame shown in FIG. 12 can be interpreted in a generalized manner, in which the STM region $B_S$ would represent the current cumulative sum of the individual STM regions in frames in a group of several of the "n" upstream channels. Similarly, the ATM regions ($B_A$, $G_A$, $X_A$) and the boundary region U would represent the current cumulative sum of the individual corresponding regions in frames in the same group of several of the "n" upstream channels. By maintaining some additional status information, in the STM and ATM buffers in the head end 109 (see FIG. 4), the processes of FIGS. 13 through 25 can be implemented for bandwidth allocation across multiple channels. Some suitable modifications to the flowcharts of FIGS. 13 through 25 may be made, in accordance with the principles on which this invention is based. These modifications can vary, based on specific implementations, but would nevertheless be used for efficient use of the aggregate bandwidth across multiple channels, in accordance with the principles of this invention. An example of the stated modification is as follows. When a second call arrives from a station 107, which already has a first call in progress, the head end 109 may determine that bandwidth in not available for the new call on the same upstream channel, say channel 202-1, that the station 107 is currently using. In that case, the head end 109 may decide to assign bandwidth for the new call on a different upstream channel 202-n, where bandwidth is currently available, and then inform the station 107 to switch to the stated different channel 202-n for the new call set-up as well as for continuation of the previously ongoing first call. This functionality may be accomplished by means of a modem feature called frequency agility, which is currently available. Then head end bandwidth controller 435 makes adjustments, concurrently and in a coordinated manner, to location and sizes of STM/ATM regions and boundary (or unassigned) regions in the frames of the two channels 202-1 and 202-n. If multiple modems are used in station 107, then the head end bandwidth controller 435 may assign bandwidth to the second call in a different channel, such as channel 202-n, while allowing the existing first call at station 107 to remain in channel 202-1.

Also, while the present invention covers what are generally referred to as (a) OSI Level 2 functions, including functions related to multiple access over a shared medium at the MAC layer, and (b) OSI Level 3 functions, including functions related to call admission and bandwidth allocation, it is to be understood that certain other OSI Level 3 functions, such as bandwidth monitoring and policing, and flow and congestion control, can also be provided using presently available techniques, and these other functions would be integrated with those provided by this invention.

Also, as previously stated, while the present invention has been described in the context of a fiber/coax based transmission infrastructure, it is to be understood that the invention is also applicable to a wireless communications environment. In the latter situation, the terms "mobile station", "base station" and "wireless medium", would be applicable in place of the terms "station", "head end" and "fiber/coax medium".

What is claimed is:

1. A method of allocating transmission bandwidth among multiple stations interconnected with a common controller via a transmission medium having a multiple access upstream channel, said method comprising the steps of dividing time in said upstream channel on said transmission medium into a series of successive time frames;

dividing each of said time frames into first and second regions separated by a boundary region, each of said first and second regions containing a one or more time slots;

said first region consisting of one or more variable length time slots for STM calls, and said second region consisting of one or more fixed length time slots assigned to (a) reservation and (b) contention oriented ATM calls; and dynamically adjusting the location and size of said boundary region in each of said frames as a function of the bandwidth requirements of said stations, and for dynamically sharing said second region to accommodate both reservation and contention types of ATM calls.

2. The method defined in claim 1 wherein said dynamic sharing increases the number of time slots assigned to contention oriented ATM calls as a function of the number of collisions that occur when multiple stations contend for time slots.

3. The method defined in claim 1 wherein said dynamic sharing adjusts the number of time slots assigned to contention oriented ATM calls as a function of arrivals and departures of contention oriented calls.

4. A method of allocating transmission bandwidth among multiple stations handling ATM calls, some of said ATM calls generating ATM/contention traffic and other of said calls generating ATM traffic requiring reserved time slots, said stations being interconnected with a common controller via a transmission medium having a multiple access upstream channel, said method comprising the steps of dividing time in said upstream channel on said transmission medium into a series of successive time frames;

dividing each of said time frames into a plurality of time slots; and assigning some of the time slots to said ATM/contention traffic and assigning others of said time slots to said ATM traffic requiring reserved time slots, said assignment being performed as a function of the frequency with which collisions occur due to simultaneous transmission in time slots assigned to said ATM/contention traffic.

5. A method of allocating transmission bandwidth among multiple stations handling ATM calls, a first type of said ATM calls generating ATM/contention traffic, a second type of said calls generating constant bit rate ATM traffic requiring reserved time slots, and a third type of said calls generating variable bit rate ATM traffic requiring reserved time slots, said stations being interconnected with a common controller via a transmission medium having a multiple access upstream channel, said method comprising the steps of:

dividing time in said upstream channel on said transmission medium into a series of successive time flames;

dividing each of said time frames into a plurality of time slots; and assigning first ones of said time slots to said first type calls;

assigning second ones of said time slots to said second type calls;

assigning third ones of said time slots to said third type calls;

when any of said assigned first, second or third time slots are vacated because corresponding ones of said first, second or third type calls are terminated, reassigning said vacated time slots to (a) new or (b) ongoing calls, said new or ongoing calls being of (a) the same or (b) a different type, said reassignment being made in accordance with the bandwidth requirement of said (a) new or (b) ongoing calls.

6. Apparatus for allocating transmission bandwidth among multiple stations interconnected with a common controller via a transmission medium having a multiple access upstream channel, said apparatus comprising means for dividing time in said upstream channel on said transmission medium into a series of successive time frames;

means for dividing each of said time frames into first and second regions separated by a boundary region, each of said first and second regions containing a one or more time slots, said first region consisting of one or more variable length time slots for STM calls, and said second region consisting of one or more fixed length time slots assigned to (a) reservation and (b) contention oriented ATM calls; and means for dynamically adjusting the location and size of said boundary region in each of said frames as a function of the bandwidth requirements of said stations, and for dynamically sharing said second region to accommodate both reservation and contention types of ATM calls.

7. The apparatus defined in claim 6 wherein said dynamic sharing increases the number of time slots assigned to contention oriented ATM calls as a function of the number of collisions that occur when multiple stations contend for time slots.

8. The apparatus defined in claim 6 wherein said dynamic sharing adjusts the number of time slots assigned to contention oriented ATM calls as a function of arrivals and departures of contention oriented calls.

9. Apparatus for allocating transmission bandwidth among multiple stations handling ATM calls, some of said ATM calls generating ATM/contention traffic and other of said calls generating ATM traffic requiring reserved time slots, said stations being interconnected with a common controller via a transmission medium having a multiple access upstream channel, said apparatus comprising means for (a) dividing time in said upstream channel on said transmission medium into a series of successive time frames and (b) dividing each of said time frames into a plurality of time slots; and means for assigning some of the time slots to said ATM/contention traffic and assigning others of said time slots to said ATM traffic requiring reserved time slots, said assignment being performed as a function of the frequency with which collisions occur due to simultaneous transmission in time slots assigned to said ATM/contention traffic.

10. Apparatus for allocating transmission bandwidth among multiple stations handling ATM calls, a first type of said ATM calls generating ATM/contention traffic, a second type of said calls generating constant bit rate ATM traffic requiring reserved time slots, and a third type of said calls generating variable bit rate ATM traffic requiring reserved time slots, said stations being interconnected with a common controller via a transmission medium having a multiple access upstream channel, said apparatus comprising means for (a) dividing time in said upstream channel on said transmission medium into a series of successive time frames and (b) dividing each of said time frames into a plurality of time slots;

means for (a) assigning first ones of said time slots to said first type calls; (b) assigning second ones of said time slots to said second type calls; and (c) assigning third ones of said time slots to said third type calls;

means operative when any of said assigned first, second or third time slots are vacated because corresponding ones of said first, second or third type calls are terminated, for reassigning said vacated time slots to (a) new or (b) ongoing calls, said new or ongoing calls being of (a) the same or (b) a different type, said reassignment being made in accordance with the bandwidth requirement said (a) new or (b) ongoing calls.

* * * * *